United States Patent
Miyashita

(10) Patent No.: US 11,063,547 B2
(45) Date of Patent: Jul. 13, 2021

(54) CONTROL DEVICE AND CONTROL METHOD FOR ROTATING ELECTRIC MACHINE

(71) Applicant: Mitsubishi Electric Corporation, Tokyo (JP)

(72) Inventor: Ryo Miyashita, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 0 days.

(21) Appl. No.: 16/757,883

(22) PCT Filed: Dec. 22, 2017

(86) PCT No.: PCT/JP2017/046140
§ 371 (c)(1),
(2) Date: Apr. 21, 2020

(87) PCT Pub. No.: WO2019/123634
PCT Pub. Date: Jun. 27, 2019

(65) Prior Publication Data
US 2020/0343847 A1    Oct. 29, 2020

(51) Int. Cl.
*H02P 23/00*    (2016.01)
*H02P 25/00*    (2006.01)
(Continued)

(52) U.S. Cl.
CPC .............. *H02P 27/08* (2013.01); *H02P 25/22* (2013.01)

(58) Field of Classification Search
CPC .................................. H02P 27/08; H02P 25/22
(Continued)

(56) References Cited

U.S. PATENT DOCUMENTS

2014/0312809 A1* 10/2014 Ishida ................... H02P 27/08
                                                                                318/139
2017/0297616 A1* 10/2017 Kikuchi ................... B62D 5/04
(Continued)

FOREIGN PATENT DOCUMENTS

EP    2690775 A2    1/2014
JP    H10337036 A    12/1998
(Continued)

OTHER PUBLICATIONS

International Search Report (PCT/ISA/210), with translation, and Written Opinion (PCT/ISA/237) dated Apr. 3, 2018, by the Japan Patent Office as the International Searching Authority for International Application No. PCT/JP2017/046140.

*Primary Examiner* — Erick D Glass
(74) *Attorney, Agent, or Firm* — Buchanan Ingersoll & Rooney PC

(57) ABSTRACT

PWM control of first and second inverters that control a double-winding type rotating electric machine is performed with mode switching between asynchronous PWM and synchronous PWM. A first-group triangular wave used for the PWM control of the first inverter is switched from the asynchronous PWM to the synchronous PWM in first timing at which carrier phases of an asynchronous PWM triangular wave and a synchronous triangular wave are matched with each other. A second-group of triangular wave used for the PWM control of the second inverter is switched from the asynchronous PWM to the synchronous PWM in second timing at which the carrier phases of the asynchronous PWM triangular wave and the synchronous triangular wave are matched with each other.

14 Claims, 12 Drawing Sheets

(51) Int. Cl.
  *H02P 27/00*  (2006.01)
  *H02P 27/08*  (2006.01)
  *H02P 25/22*  (2006.01)
(58) Field of Classification Search
  USPC .......................................................... 318/811
  See application file for complete search history.

(56) References Cited

U.S. PATENT DOCUMENTS

2020/0220488 A1\*  7/2020  Mori ...................... B62D 5/046
2020/0244201 A1\*  7/2020  Nishijima ............... H02P 25/20

FOREIGN PATENT DOCUMENTS

| JP | 2011250671 A | 12/2011 |
| JP | 2014027764 A | 2/2014 |
| JP | 2014138494 A | 7/2014 |
| JP | 2016149904 A | 8/2016 |
| JP | 2017093208 A | 5/2017 |

\* cited by examiner

CONTROL DEVICE AND CONTROL METHOD FOR ROTATING ELECTRIC MACHINE

TECHNICAL FIELD

The present disclosure relates to a control device and a control method for a rotating electric machine, and more particularly to control of a double winding type rotating electric machine including a first-group winding and a second-group winding.

BACKGROUND ART

For example, Japanese Patent Laying-Open No. 2017-93208 (PTL 1) discloses a control configuration in which an inverter is separately provided for each multiplexed winding group in a rotating electric machine in which windings of the rotating electric machine are multiplexed.

PTL 1 discloses a configuration in which two inverters are provided for a double winding type three-phase motor and each of the two inverters includes a U-phase leg, a V-phase leg, and a W-phase leg. Further, in PTL 1, what is called "synchronous PWM control" in which a frequency of a PWM (Pulse Width Modulation) carrier wave (hereinafter, also simply referred to as a "carrier wave") is synchronized with an integral multiple of the rotation frequency of the rotating electric machine and "asynchronous PWM control" in which the frequency of the carrier wave is fixed are selectively used with respect to PWM control typically used for switching control of the inverter. Specifically, the asynchronous PWM and the synchronous PWM are selected according to a rotation speed of an electric motor and temperatures of a semiconductor switching element and a diode constituting the inverter.

CITATION LIST

Patent Literature

PTL 1: Japanese Patent Laying-Open No. 2017-93208

SUMMARY OF INVENTION

Technical Problem

In the double winding type rotating electric machine, in a configuration in which the first-group winding and the second-group winding are wound so as to have a mechanical angle difference, the PWM control is performed in each of the first and second inverters that control the voltages applied to the first-group winding and the second-group winding. In the synchronous PWM, because the phase of the carrier wave is synchronized with the phase of the electrical angle in each winding group, a phase difference exists between the carrier waves in each of the first and second inverters.

For this reason, in the PWM control of the first and second inverters, when the synchronous PWM and the asynchronous PWM are simultaneously switched, the control becomes unstable because the phase of the carrier wave becomes discontinuous. However, PTL 1 does not particularly consider the phase of the carrier wave when the synchronous PWM and the asynchronous PWM are switched.

The present disclosure has been made to solve such a problem, and an object of the present disclosure is to smoothly switch the synchronous PWM and the asynchronous PWM in the inverter control of the double winding type rotating electric machine including the first-group winding and the second-group winding that are wound with a mechanical angle difference.

Solution to Problem

According to one aspect of the present disclosure, a control device for a double winding type rotating electric machine including a first-group winding and a second-group winding wound around a stator with a mechanical angle difference, includes a voltage command operation unit, a carrier wave supply unit, and a PWM controller. The carrier wave supply unit includes a carrier wave controller. The voltage command operation unit generates a first-group voltage command for a first inverter that controls a voltage applied to the first-group winding and a second-group voltage command for a second inverter that controls a voltage applied to the second-group winding. The carrier wave supply unit generates a first carrier wave used for first pulse width modulation control in the first inverter and a second carrier wave used for second pulse width modulation control in the second inverter. The PWM controller generates a first-group PWM signal for controlling the first inverter by the first pulse width modulation control based on comparison between the first-group voltage command and the first carrier wave, and generates a second-group PWM signal for controlling the second inverter by the second pulse width modulation control based on comparison between the second-group voltage command and the second carrier wave. A carrier wave controller switches between the first and second carrier waves used for the first pulse width modulation control and the second pulse width modulation control according to selection of one of a first mode in which frequencies of the first and second carrier waves change so as to become an integral multiple of a frequency of the applied voltage and a second mode in which the frequencies of the first and second carriers are kept constant. When the mode switching between the first and second modes is instructed, the carrier wave controller performs the mode switching in first timing at which a carrier wave phase according to the first mode and a carrier wave phase according to the second mode are matched with each other on one carrier wave of the first and second carrier waves. The carrier wave controller performs the mode switching in second timing at which the carrier wave phase according to the first mode and the carrier wave phase according to the second mode are matched with each other on the other carrier wave of the first and second carrier waves after the first timing.

According to another aspect of the present disclosure, a control method for a double winding type rotating electric machine including a first-group winding and a second-group winding wound around a stator with a mechanical angle difference, includes: (1) generating a first-group voltage command for a first inverter that controls a voltage applied to the first-group winding and a second-group voltage command for a second inverter that controls a voltage applied to the second-group winding; (2) supplying a first carrier wave used for first pulse width modulation control in the first inverter and a second carrier wave used for second pulse width modulation control in the second inverter; and (3) generating a first-group PWM signal for controlling the first inverter by the first pulse width modulation control based on comparison between the first-group voltage command and the first carrier wave, and generating a second-group PWM signal for controlling the second inverter by the second pulse width modulation control based on comparison between the second-group voltage command and the second carrier wave. Supplying the first and second carrier waves includes switching between the first and second carrier waves used for the first pulse width modulation control and the second pulse width modulation control according to selection of one of a first mode in which frequencies of the first and second carrier waves change so as to become an integral multiple of a frequency of the applied voltage and a second mode in which the frequencies of the first and second carrier waves are kept constant. Switching between the first and second carrier waves includes: when the mode switching between the first and second modes is instructed, performing the mode switching in first timing at which a carrier wave phase according to the first mode and a carrier wave phase according to the second mode are matched with each other on one carrier wave of the first and second carrier waves; and performing the mode switching in second timing at which the carrier wave phase according to the first mode and the carrier wave phase according to the second mode are matched with each other on the other carrier wave of the first and second carrier waves after the first timing.

Advantageous Effects of Invention

In the present disclosure, continuity of the carrier wave phase during the mode switching can be ensured for both the first and second carrier waves used in the PWM control of the first and second inverters controlling the double winding type rotating electric machine including the first-group winding and the second-group winding wound with the mechanical angle difference, so that the mode switching between the synchronous PWM and the asynchronous PWM can smoothly be performed.

DESCRIPTION OF EMBODIMENTS

Figure 1:
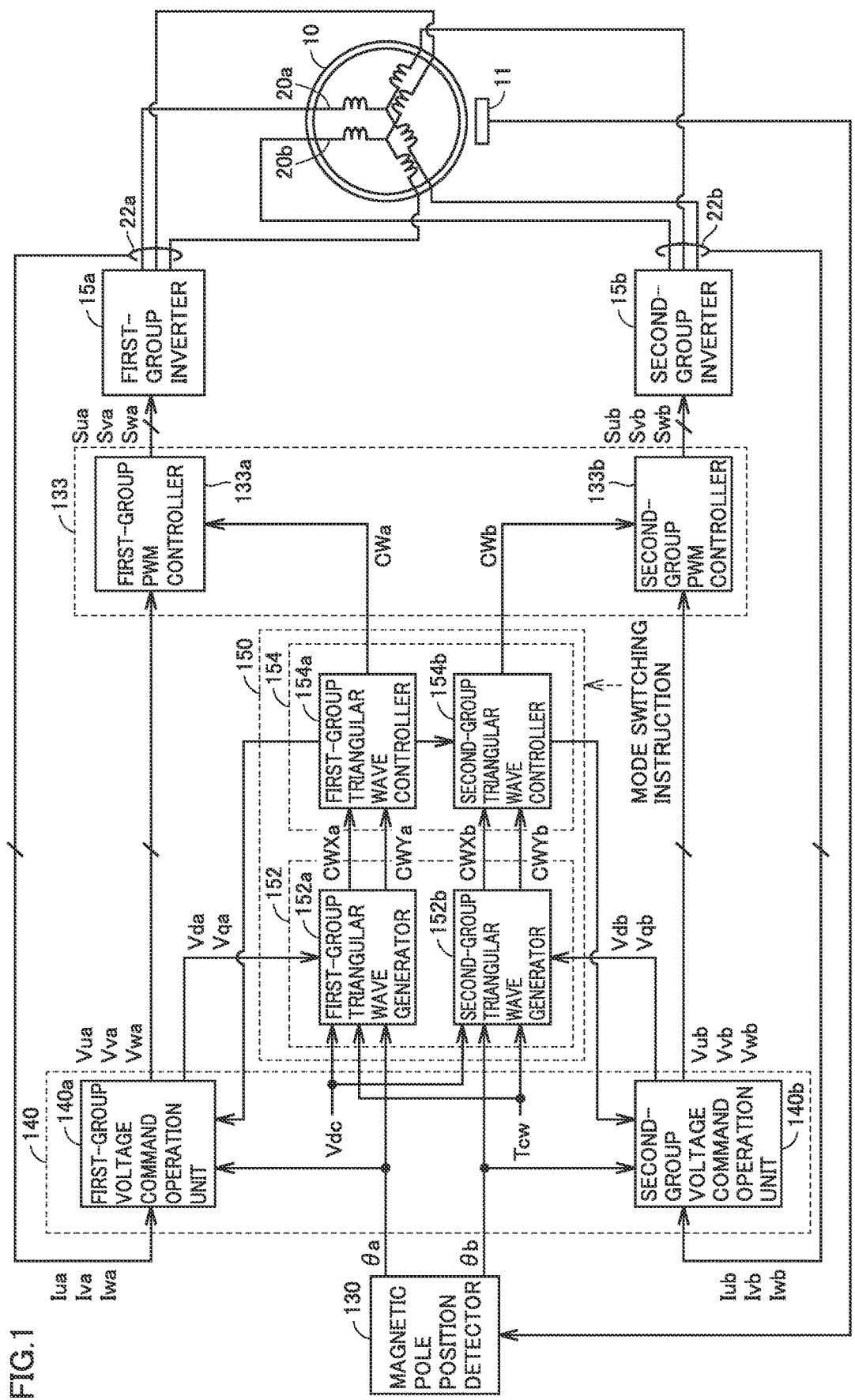
FIG. 1 is a block diagram illustrating a schematic configuration of a motor system controlled by a control device for a rotating electric machine according to the present embodiment.

Hereinafter, embodiments of the present disclosure will be described with reference to the drawings. In the following description, the same or corresponding portions in the drawings are denoted by the same reference numeral, and the description will not be repeated in principle.

First Embodiment

FIG. 1 is a block diagram illustrating a schematic configuration of a motor system controlled by a control device for a rotating electric machine according to the present embodiment.

With reference to FIG. 1, the motor system includes a double winding type rotating electric machine 10 to be controlled (hereinafter, also simply referred to as a rotating electric machine 10), inverters 15a, 15b, and a control device 100. A rotation angle sensor 11 and current sensors 22a and 22b are disposed in rotating electric machine 10.

The double winding type rotating electric machine includes a first-group winding 20a and a second-group winding 20b. First-group winding 20a is a three-phase winding of a U-phase, a V-phase, and a W-phase, and second-group winding 20b is a three-phase winding of the U-phase, the V-phase, and the W-phase. First-group and second-group windings 20a, 20b are wound around a stator. For example, a permanent magnet synchronous AC rotating electric machine in which a permanent magnet is provided in a rotor can be applied to rotating electric machine 10. In the first embodiment, two groups of windings 20a, 20b are provided in one stator (not illustrated), and one or a plurality of pole pairs of permanent magnets are provided in one rotor (not illustrated) disposed on a radial inside of the stator.

First-group winding 20a and second-group winding 20b are wound around the stator with a constant mechanical phase difference (angle difference). That is, a constant phase difference is provided between the first-group U-phase winding and the second-group U-phase winding, between the first-group V-phase winding and the second-group V-phase winding, and between the first-group W-phase winding and the second-group W-phase winding.

Inverter 15a converts DC power supplied from a DC power supply (not illustrated) into AC power, and supplies the AC power to first-group winding 20a. Inverter 15b converts the same DC power into the AC power, and supplies the AC power to second-group winding 20b. Hereinafter, inverter 15a is also referred to as a first-group inverter 15a, and inverter 15b is also referred to as a second-group inverter 15b.

Each of first-group inverter 15a and second-group inverter 15b includes a plurality of switching elements. Each of inverters 15a, 15b has a configuration in which three sets of series circuits for one phase, in which a positive-side switching element connected to a positive terminal of the DC power supply and a negative-side switching element connected to a negative terminal of the DC power supply are connected in series, are provided according to the three-phase winding. A connection point of the two switching elements in each series circuit is connected to the corresponding phase winding. A MOSFET (Metal Oxide Semiconductor Field Effect Transistor), an IGBT (Insulated Gate Bipolar Transistor), or the like can be used as the switching element.

A gate terminal of each switching element is connected to control device 100 through a gate drive circuit (not illustrated). The on and off states of the switching elements for the three phases constituting first-group inverter 15a are controlled by first-group PWM signals Sua, Sva, Swa. Specifically, the on and off states of the positive-side and negative-side switching elements connected to the U-phase winding are controlled by PWM signal Sua, and the on and off states of the positive-side and negative-side switching elements connected to the V-phase winding are controlled by PWM signal Sva, and the on and off states of the positive-side and negative-side switching elements connected to the W-phase winding are controlled by PWM signal Swa. Similarly, for second-group inverter 15b, on and off states of the switching elements for three phases are controlled by second-group PWM signals Sub, Svb, Swb.

Current sensor 22a is disposed to detect current passed through first-group winding 20a, and current sensor 22b is disposed to detect current passed through second-group winding 20b. For example, current sensor 22a is disposed on a power line connected to a series circuit (not illustrated) of the switching elements constituting first-group inverter 15a and each phase winding constituting first-group winding 20a. Similarly, current sensor 22b is disposed on a power line connected to a series circuit (not illustrated) of switching elements constituting second-group inverter 15b and each phase winding constituting second-group winding 20b. Hereinafter, current sensor 22a is also referred to as a first-group current sensor 22a, and current sensor 22b is also referred to as a second-group current sensor 22b.

Rotation angle sensor 11 detects a rotation angle (magnetic pole position) of the rotor (not illustrated) of rotating electric machine 10. For example, rotation angle sensor 11 can be formed of a resolver.

Control device 100 includes a magnetic pole position detector 130, a voltage command operation unit 140, a triangular wave supply unit 150, and a PWM controller 133 as a functional block for motor control. As will be apparent from the following description, control device 100 controls rotating electric machine 10 through first-group inverter 15a and second-group inverter 15b. Specifically, first-group PWM signals Sua, Sva, Swa and second-group PWM signals Sub, Svb, Swb for controlling the AC voltage output from first-group and second-group inverters 15a, 15b are generated by feedback control using detection values of the rotation angle and the current of rotating electric machine 10 such that rotating electric machine 10 operates according to a current command value based on an operation command (output torque).

Figure 2:
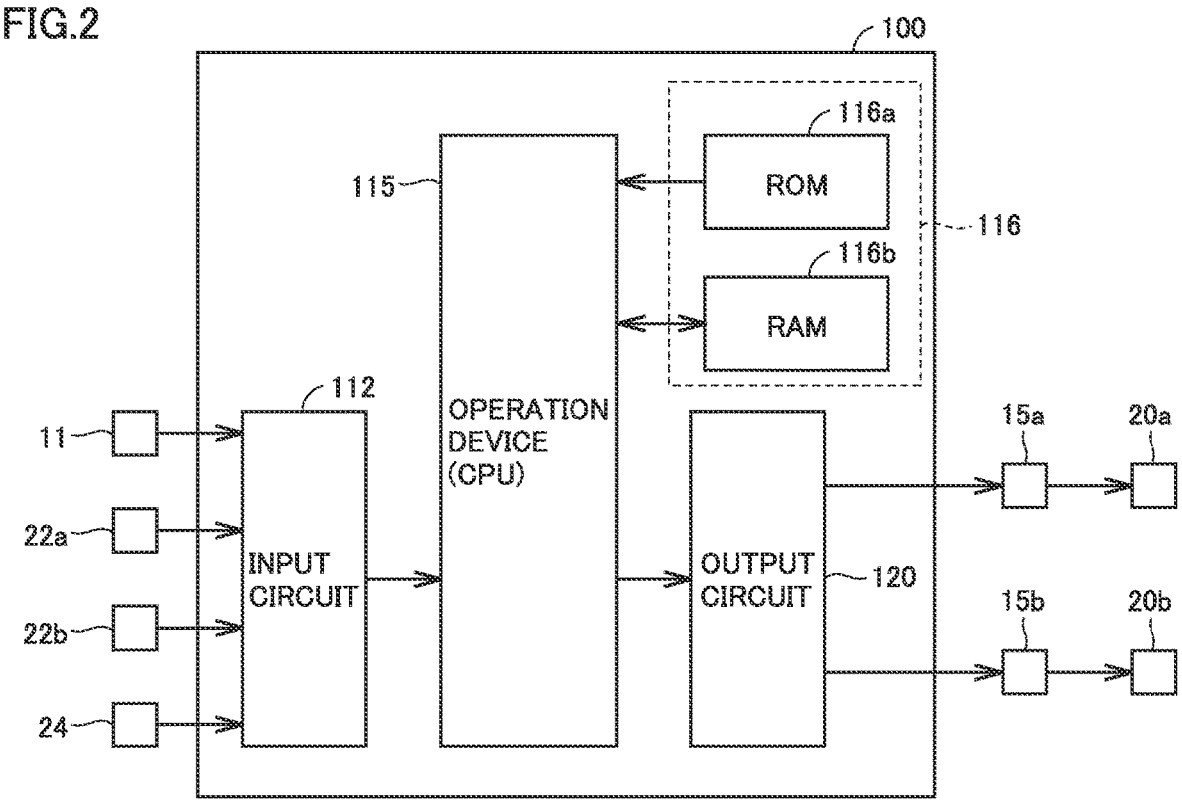
FIG. 2 is a block diagram illustrating a configuration example of the control device in FIG. 1.

FIG. 2 is a block diagram illustrating a configuration example of control device 100.

With reference to FIG. 2, control device 100 includes an input circuit 112, an operation device 115, a storage device 116, and an output circuit 120 as hardware. Operation device 115 can be formed of a CPU (Central Processing Unit), a DSP (Digital Signal Processor), an ASIC (Application Specific Integrated Circuit), or the like.

Storage device 116 exchanges data with operation device 115. For example, storage device 116 includes a RAM (Random Access Memory) 116a configured to be able to read and write data from and into operation device 115 and a ROM (Read Only Memory) 116b configured to be able to read data from operation device 115.

Input circuit 112 has an A/D conversion function of inputting a signal from an external sensor or switch of control device 100 to operation device 115. In the configuration example of FIG. 1, the output values of rotation angle sensor 11 and current sensors 22a, 22b in FIG. 1 are input to input circuit 112, and the output value of voltage sensor 24 that detects the DC voltage supplied from the DC power supply (not illustrated) to inverters 15a, 15b is also input to input circuit 112. Operation device 115 can acquire the rotation angle detected by rotation angle sensor 11, the current values (three-phase) detected by current sensors 22a, 22b, and the voltage detected by voltage sensor 24 through input circuit 112.

Output circuit 120 has a function of outputting an electric signal to an external device of control device 100. In the configuration example of FIG. 1, output circuit 120 outputs first-group PWM signals Sua, Sva, Swa and second-group PWM signals Sub, Svb, Swb to gate drive circuits (not illustrated) of first-group inverter 15a and second-group inverter 15b.

With reference to FIG. 1 again, typically operation device 115 executes software (program) stored in storage device 116 such as ROM 116b, and cooperates with other hardware of control device 100 such as storage device 116, input circuit 112, and output circuit 120, thereby implementing the functions of the functional blocks constituting control device 100. A part or all of the functions of each functional block can also be implemented by a dedicated electronic circuit (hardware).

Each function of control device 100 will be described in detail below.

Based on the output signal of rotation angle sensor 11, magnetic pole position detector 130 calculates the rotation angle (hereinafter, also referred to as a motor rotation angle) of rotating electric machine 10 corresponding to the rotor magnetic pole position (in this example, the position of an N pole of the permanent magnet) of the rotor at an electrical angle. Magnetic pole position detector 130 can calculate a rotation angular velocity at the electrical angle by differentiating the motor rotational angle with time.

In the first embodiment, the detection value of the rotation angle corresponding to the magnetic pole position of the rotor with respect to first-group winding 20a (for example, the U-phase winding) and the detection value of the rotation angle corresponding to the magnetic pole position of the rotor with respect to the second-group winding 20b (for example, the U-phase winding) are input from rotation angle sensor 11 to magnetic pole position detector 130. Magnetic pole position detector 130 calculates a motor rotation angle θa based on the first-group winding and a motor rotation angle θb based on the second-group winding, based on the detection values of rotation angle sensor 11.

An angle difference (phase difference) obtained by converting a mechanical angle difference (phase difference) between first-group winding 20a and second-group winding 20b wound around the stator into the electrical angle exists between motor rotation angle θa based on the first-group winding and motor rotation angle θb based on the second-group winding. That is, when the above inter-group phase difference (electrical angle) Δθcoil is used, a relationship given by the following equation (1) holds between motor rotation angle θa based on the first-group winding and motor rotation angle θb based on the second-group winding.

$$\theta b = \theta a + \Delta\theta coil \quad (1)$$

The mechanical phase difference between first-group winding 20a and second-group winding 20b is multiplied by the number of pole pairs, and the product is divided by 2, thereby obtaining an inter-group phase difference Δθcoil in the equation (1).

After calculating motor rotation angle θa from the detection value of rotation angle sensor 11, magnetic pole position detector 130 can further obtain motor rotation angle θb by the operation of the equation (1).

Voltage command operation unit 140 includes a voltage command operation unit 140a that generates voltage commands Vua, Vva, Vwa for the voltage applied to first-group winding 20a and a voltage command operation unit 140b that generates voltage commands Vub, Vvb, Vwb for the voltage applied to second-group winding 20b. Hereinafter, voltage command operation unit 140a is also referred to as a first-group voltage command operation unit 140a, and voltage command operation unit 140b is also referred to as a second-group voltage command operation unit 140b. Similarly, voltage commands Vua, Vva, Vwa are also referred to as a first-group voltage command, and voltage commands Vub, Vvb, Vwb are also referred to as a second-group voltage command.

Voltage command operation units 140a, 140b can generate the voltage command by performing current feedback control on a rotating coordinate system of a dq-axis. As is well known, the rotating coordinate system of the dq-axes is a two-axis rotating coordinate system that rotates in synchronization with rotation of the rotor (not illustrated) at the electrical angle. A d-axis is defined by the magnetic pole position of the rotor (for example, the orientation of the N pole of the permanent magnet). A q-axis is defined as a direction advanced by 90° (π/2) in terms of electrical angle from the d-axis.

Figure 3:
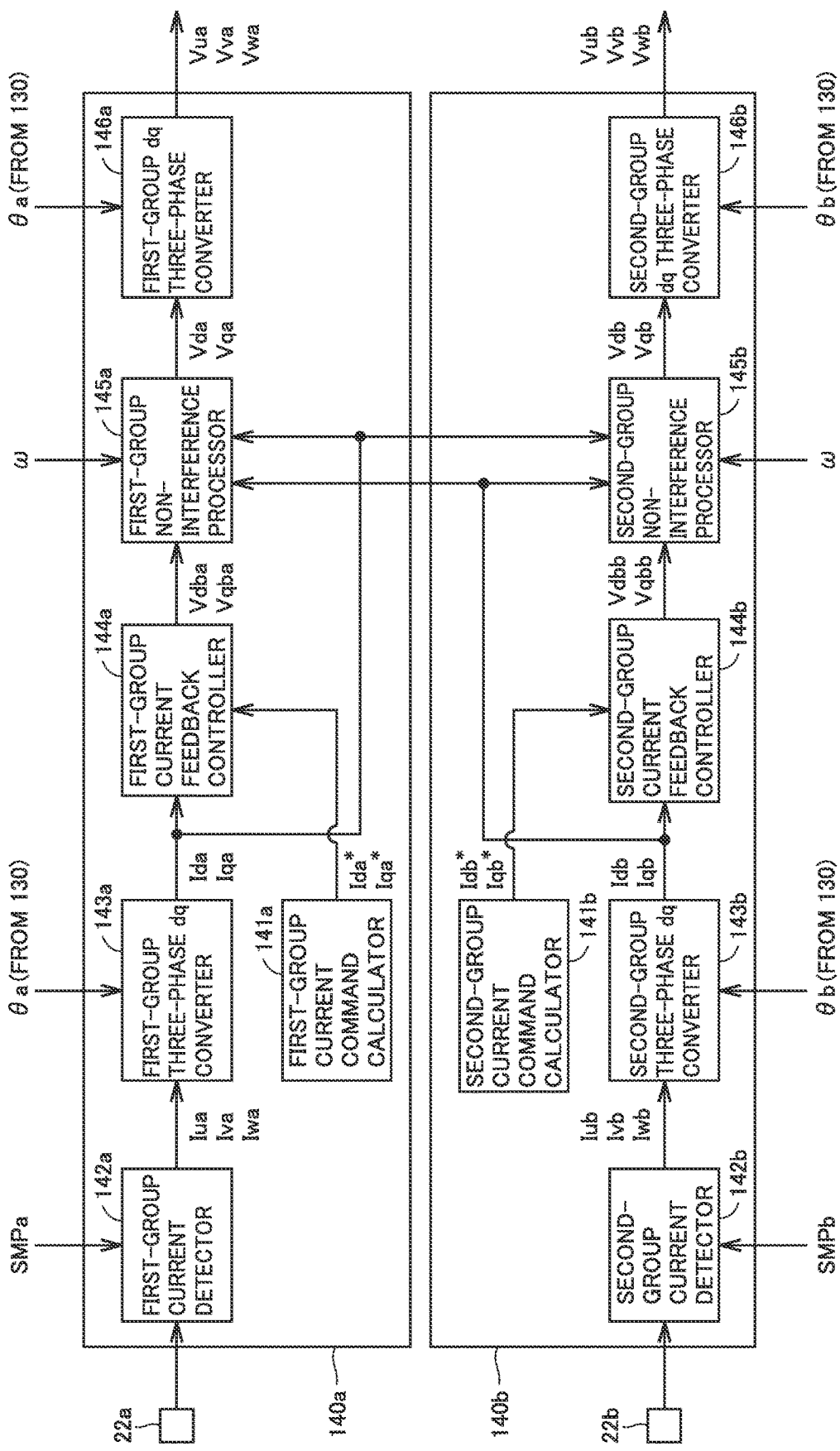
FIG. 3 is a functional block diagram illustrating a specific control configuration example for voltage command calculation.

With reference to FIG. 3, a specific control configuration example for voltage command calculation will be described below.

With reference to FIG. 3, first-group voltage command operation unit 140a changes first-group dq-axis voltage commands Vda, Vqa such that dq-axis currents Ida, Iqa of first-group winding 20a come close to first-group dq-axis current commands Ida*, Iqa*. Similarly, the second-group voltage command operation unit 140b changes second-group dq-axis voltage commands Vdb, Vqb such that dq-axis currents Idb, Iqb of second-group winding 20b come close to second-group dq-axis current commands Idb*, Iqb*.

First-group voltage command operation unit 140a includes a first-group current command calculator 141a, a first-group current detector 142a, a first-group three-phase dq converter 143a, a first-group current feedback controller 144a, and a first-group non-interference processor 145a, and a first-group dq three-phase converter 146a. Similarly, second-group voltage command operation unit 140b includes a second-group current command calculator 141b, a second-group current detector 142b, a second-group three-phase dq converter 143b, a second-group current feedback controller 144b, a second-group non-interference processor 145b, and a second-group dq three-phase converter 146b.

First-group current command calculator 141a calculates first-group d-axis current command Ida* and first-group q-axis current command Iqa*. Second-group current command calculator 141b calculates second-group d-axis current command Idb* and the second-group q-axis current command Iqb*. For example, the dq-axis current command of each group is calculated from a torque command of rotating electrical machine 10 by a current vector control method such as maximum torque current control, flux weakening control, and control of Id=0.

First-group current detector 142a detects currents Iua, Iva, Iwa of each phase of first-group winding 20a based on the output signal of current sensor 22a. Second-group current detector 142b detects currents Iub, Ivb, Iwb of each phase of second-group winding 20b based on the output signal of current sensor 22b.

First-group three-phase dq converter 143a converts first-group phase currents Iua, Iva, Iwa detected by first-group current detector 142a into first-group d-axis current Ida and first-group q-axis current Iqa. Similarly, second-group three-phase dq conversion unit 143b converts second-group phase currents Iub, Ivb, Iwb detected by second-group current detector 142b into second-group d-axis current Idb and second-group q-axis current Iqb. In three-phase dq conversion units 143a, 143b, each phase current is converted into the dq current represented by the dq-axis rotation coordinate system based on the first-group or second-group winding by a three-phase-two-phase conversion and a rotation coordinate conversion based on the motor rotation angle θa.

First-group current feedback controller 144a changes first-group dq-axis voltage commands Vdba, Vqba such that first-group dq-axis currents Ida, Iqa come close to first-group dq-axis current commands Ida*, Iqa*. For example, the first-group dq-axis current feedback control can be performed by PI control operation exemplified in the following equations (2), (3).

$$Vdba = (Kpd + Kid/s) \cdot (Ida^* - Ida) \quad (2)$$

$$Vqba = (Kpq + Kiq/s) \cdot (Iqa^* - Iqa) \quad (3)$$

In the equations (2), (3), Kpd is a d-axis proportional gain, Kpq is a q-axis proportional gain, Kid is a d-axis integral gain, and Kiq is a q-axis integral gain. S is a Laplace operator.

Similarly, second-group current feedback controller 144b changes second-group dq-axis voltage commands Vdbb, Vqbb such that second-group dq-axis currents Idb, Iqb come close to second-group dq-axis current commands Idb*, Iqb*. For example, first-group dq-axis current feedback control can be performed by the PI control operation exemplified in the following equations (4), (5).

$$Vdbb = (Kpd + Kid/s) \cdot (Idb^* - Idb) \quad (4)$$

$$Vqbb = (Kpq + Kiq/s) \cdot (Iqb^* - Iqb) \quad (5)$$

In the equations (4), (5), Kpd, Kpq, Kid, Kiq, and s are the same as those in the equations (2), (3).

First-group non-interference processor 145a and second-group non-interference processor 145b perform first non-interference processing of compensating for interference due to magnetic coupling between the windings of the same group and second non-interference processing of compensating for interference due to magnetic coupling between the windings of different groups, on feedback values of the first-group and second-group dq-axis voltage commands, respectively. Final first-group dq-axis voltage commands Vda, Vqa and final second-group dq-axis voltage commands Vdb, Vqb are generated through the first and second pieces of non-interference processing of the non-interference processors 145a, 145b.

For example, first-group non-interference processor 145a performs the non-interference processing by calculations illustrated in the following equations (6), (7).

$$Vda = Vdba - \omega \cdot Lqa \cdot Iqa + Mdb \cdot s \cdot Idb - \omega \cdot Mqb \cdot Iqb \quad (6)$$

$$Vqa = Vqba - \omega \cdot (Lda \cdot Iqa + \Phi) + Mqb \cdot s \cdot Iqb - \omega \cdot Mdb \cdot Idb \quad (7)$$

Similarly, second-group non-interference processor 145b performs the non-interference processing by calculations illustrated in the following equations (8), (9).

$$Vdb = Vdbb - \omega \cdot Lgb \cdot Iqb + Mda \cdot s \cdot Ida - \omega \cdot Mqa \cdot Iqa \quad (8)$$

$$Vqb = Vqbb - \omega \cdot (Ldb \cdot Idb + \Phi) + Mqa \cdot s \cdot Iqa - \omega \cdot Mda \cdot Ida \quad (9)$$

In the equations (6) to (9), Lda and Lqa are the same-group d-axis inductance of the first group and the same-group q-axis inductance of the first group that affect the first group, respectively. Ldb and Lqb are the same-group d-axis inductance of the second group and the same group q-axis inductance of the second group that affect the second group, respectively. Mda and Mqa are an inter-group d-axis inductance of the first group and an inter-group q-axis inductance of the first group that affect the second group, respectively. Mdb and Mqb are an inter-group d-axis inductance of the second group and an inter-group q-axis inductance of the second group that affect the first group, respectively. Φ is a flux linkage of the permanent magnet, s is a Laplace operator, and ω is an angular acceleration that can be calculated by differentiating motor rotation angle θa.

In the equations (6), (7), "ω·Lqa·Iqa" and "ω·(Lqa·Iqa+Φ)" are a term for same-group non-interference processing, and "Mdb·s·Idb", "ω·Mqb·Iqb", "Mqb·s·Iqb", and "ω·Mdb·Idb" are a term for inter-group non-interference processing.

Similarly, "ω·Lqb·Iqb" and "ω·(Lqb·Iqb+Φ)" in the equations (8), (9) are the term for the same-group non-interference processing, and "Mda·s·Ida", "ω·Mqa·Iqa", "Mqa·s·Iqa", and "ω·Mda·Ida" are the term for the inter-group non-interference processing. The operation for the non-interference processing is not limited to the above example. For example, first-group non-interference processor 145a and second-group non-interference processor 145b perform the non-interference processing operation according to the description in Japanese Patent Laying-Open No. 2016-149904 or Japanese Patent Laying-Open No. 2014-138494.

As described above, in the inter-group non-interference processing, first-group non-interference processor 145a corrects feedback values Vqba, Vdba of the first-group dq-axis voltage command based on second-group dq-axis currents Idb, Iqb. Similarly, second-group non-interference processor 145b corrects feedback values Vdbb, Vqbb of second-group dq-axis voltage command based on first-group dq-axis currents Ida, Iqa.

On the other hand, when a determination that the same-group non-interference processing and the inter-group non-interference processing are not performed is made based on an operating condition of rotating electrical machine 10, first-group non-interference processor 145a and second-group non-interference processor 145b can set the feedback values of the first-group and second-group dq-axis voltage commands to the final first-group and second-group dq-axis voltage commands, directly. Alternatively, first-group non-interference processor 145a and second-group non-interference processor 145b set the final first-group and second-group dq-axis voltage commands at a value obtained by performing only the same-group non-interference processing on the feedback values of the first-group and second-group dq-axis voltage commands.

A first-group dq three-phase converter 146a performs fixed coordinate conversion and two-phase three-phase conversion based on motor rotation angle θa with respect to first-group winding 20a, thereby converting first-group dq-axis voltage commands Vda, Vqa into first-group voltage commands Vua, Vva, Vwa that are an AC voltage commands for each phase (three phases) of first-group winding 20a.

Similarly, a second-group dq three-phase converter 146b performs the fixed coordinate conversion and the two-phase three-phase conversion based on motor rotation angle θb with respect to second-group winding 20b of the second group, thereby converting second-group dq-axis voltage commands Vdb, Vqb into second-group voltage commands Vub, Vvb, Vwb that are an AC voltage commands for each phase (three phases) of second-group winding 20b.

First-group voltage commands Vua, Vva, Vwa generated by first-group voltage command operation unit 140a are represented by sine wave voltages having phases different from one another by 120 degrees (electrical angle). Similarly, second-group voltage commands Vub, Vvb, Vwb generated by second-group voltage command operation unit 140b are represented by sine wave voltages having phases different from one another by 120 degrees (electrical angle).

With reference to FIG. 1 again, triangular wave supply unit 150 includes a triangular wave generator 152 and a triangular wave controller 154. Triangular wave supply unit 150 generates a triangular wave CWa used for PWM control of first-group inverter 15a and a triangular wave CWb used for PWM control of second-group inverter 15b.

PWM controller 133 includes a first-group PWM controller 133a and a second-group PWM controller 133b. First-group PWM controller 133a generates first-group PWM signals Sua, Sva, Swa by comparing the voltages of first-group voltage commands Vua, Vva, Vwa and first-group triangular wave CWa. The on and off states of the positive-side switching element and the negative-side switching element of each phase constituting first-group inverter 15a are controlled according to first-group PWM signals Sua, Sva, Swa. Consequently, first-group inverter 15a controls the voltage applied to first-group winding 20a according to first-group PWM signals Sua, Sva, Swa.

Second-group PWM controller 133b generates second-group PWM signals Sub, Svb, Swb by comparing the voltages of second-group voltage commands Vub, Vvb, Vwb to second-group triangular wave CWb. The on and off states of the positive-side switching element and the negative-side switching element of each phase constituting second-group inverter 15b are controlled according to second-group PWM signals Sub, Svb, Swb. Consequently, second-group inverter 15b controls the voltage applied to second-group winding 20b according to second-group PWM signals Sub, Svb, Swb.

In the motor system of the present embodiment, synchronous PWM or asynchronous PWM is selectively applied in the PWM control for controlling the output voltages of inverters 15a, 15b.

For example, the selection is switched between the synchronous PWM and the asynchronous PWM according to a rotation speed region of rotating electric machine 10 or the degree of heat generation of inverters 15a, 15b. Thus, triangular wave supply unit 150 is configured to switch between the synchronous PWM and the asynchronous PWM.

Triangular wave generator 152 includes a first-group triangular wave generator 152a and a second-group triangular wave generator 152b. Triangular wave control section 154 includes a first-group triangular wave controller 154a and a second-group triangular wave controller 154b.

First-group triangular wave generator 152a generates a synchronous PWM triangular wave CWXa and an asynchronous PWM triangular wave CWYa. Second-group triangular wave generator 152b generates a synchronous PWM triangular wave CWXb and an asynchronous PWM triangular wave CWYb. As described later, sometimes a phase difference is generated between synchronous PWM triangular waves CWXa, CWXb and between asynchronous PWM triangular waves CWYa, CWYb.

Figure 4:
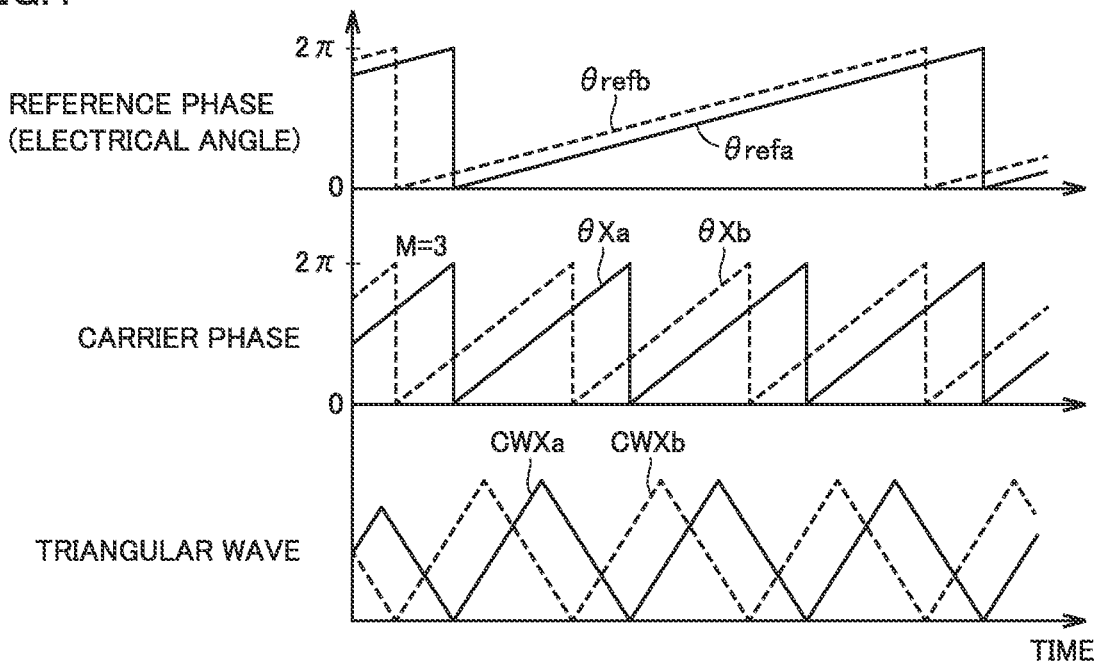
FIG. 4 is a conceptual waveform chart illustrating a triangular wave used for synchronous PWM.

FIG. 4 is a conceptual waveform chart illustrating the triangular wave used for the synchronous PWM.

With reference to FIG. 4, first-group triangular wave generator 152a changes a phase θXa (hereinafter, also referred to as a carrier phase θXa) of first-group synchronous PWM triangular wave CWXa according to a first-group reference phase θrefa. First-group reference phase θrefa is calculated by the following equations (10), (11) according to motor rotation angle θa based on first-group winding 20a and a first-group voltage command phase θvdqa with respect to motor rotation angle θa.

$$\theta refa = \theta a + \theta vdqa - (\pi/2) \quad (10)$$

$$\theta vdqa = \tan^{-1}(Vqa/Vda) \quad (11)$$

Similarly, second-group triangular wave generator 152b changes a phase θXb (hereinafter, also referred to as a carrier phase θXb) of second-group synchronous PWM triangular wave CWXb according to a second-group reference phase θrefb. Second-group reference phase θrefb is calculated by the following equations (12), (13) according to motor rotation angle θb based on second-group winding 20b and a second-group voltage command phase θvdqb with respect to motor rotation angle θb.

$$\theta refb = \theta b + \theta vdqb - (\pi/2) \quad (12)$$

$$\theta vdqb = \tan^{-1}(Vqb/Vdb) \quad (13)$$

An equation (14) is obtained when the equation (12) is deformed using the equation (1), so that a phase difference Δθref (Δθref=θrefa−θrefb) between reference phases θrefa, θrefb is given by the following equation (15).

$$\theta refb = \theta a + \Delta\theta coil + \theta vdqb - (\pi/2) \quad (14)$$

$$\Delta\theta ref = (\theta vdqa - \theta vdqb) - \Delta\theta coil \quad (15)$$

First-group triangular wave generator 152a calculates phase θXa in synchronization with first-group reference phase θrefa such that M triangular waves are generated within one cycle (0 to 2π) of first-group reference phase θrefa. M is an integer of 2 or more, but is typically set to an integer represented by 3·(2·i−1) such as 3 and 9 (i is a previously-set natural number). In the first embodiment, it is assumed that M=3.

As illustrated in FIG. 4, first-group triangular wave generator 152a calculates carrier phase θXa so as to change at a speed three times (M times) first-group reference phase θrefa. Consequently, while reference phase θrefa changes from 0 to 2π, carrier phase θXa is calculated such that the change from 0 to 2π is repeated three times.

First-group triangular wave generator 152a generates synchronous PWM triangular wave CWXa so as to oscillate once from "valley" to "valley" in response to the change from 0 to 2π of carrier phase θXa. For example, map data associating carrier phase θXa with a voltage ratio to an amplitude of synchronous PWM triangular wave CWXa is previously created. For example, the map data can be created such that the triangular wave of "valley" is formed when the carrier phase is 0 or 2π, and such that the triangular wave of "peak" is formed when the carrier phase is π.

An amplitude value of synchronous PWM triangular wave CWXa is set to a DC voltage Vdc input to inverter 15a (that is, the value detected by voltage sensor 24). Thus, first-group triangular wave generator 152a can calculate the voltage value of synchronous PWM triangular wave CWXa in each timing by referring to the map data using carrier phase θXa and DC voltage Vdc.

Similarly, second-group triangular wave generator 152b calculates carrier phase θXb so as to change at a speed three times (M times) second-group reference phase θrefb. Consequently, while reference phase θrefb changes from 0 to 2π, carrier phase θXb is calculated such that the change from 0 to 2π is repeated three times.

Second-group triangular wave generator 152b generates synchronous PWM triangular wave CWXb so as to oscillate once from "valley" to "valley" while carrier phase θXb changes from 0 to 2π. For example, using the map data common to first-group triangular wave generator 152a, second-group triangular wave generator 152b can calculate the voltage value of synchronous PWM triangular wave CWXb in each timing from carrier phase θXb and DC voltage Vdc. Synchronous PWM triangular waves CWXa, CWXb correspond to an aggregate of the voltage values calculated in each timing. The phase difference corresponding to M times Δθref in the equation (15) is generated between synchronous PWM triangular waves CWXa, CWXb.

Figure 5:
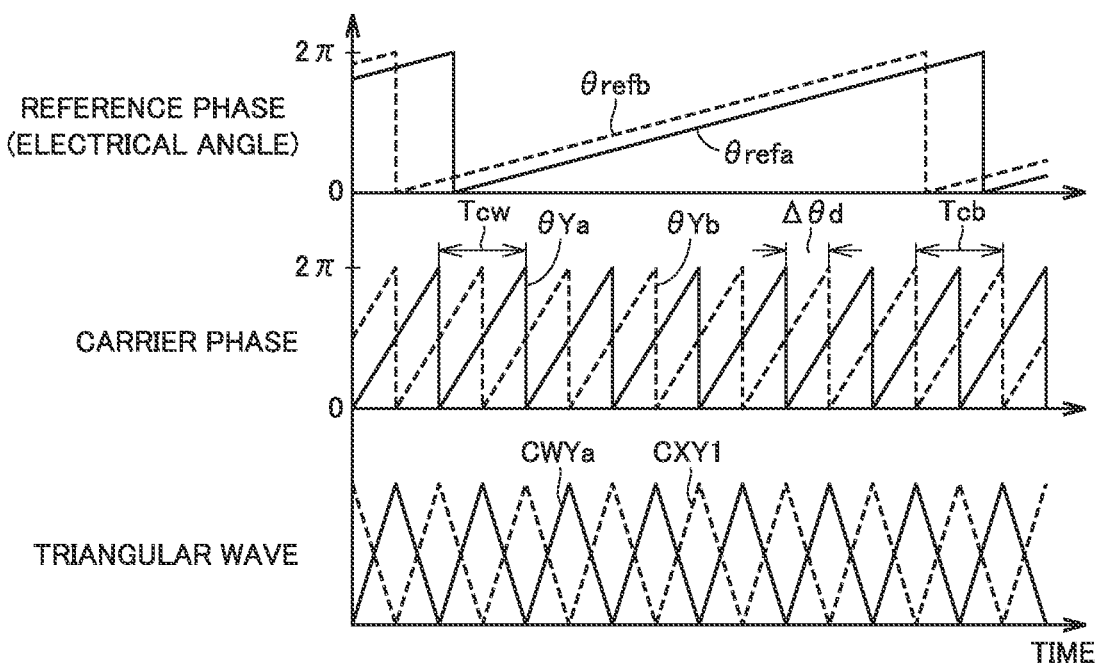
FIG. 5 is a conceptual waveform chart illustrating a triangular wave used for asynchronous PWM.

FIG. 5 is a conceptual waveform chart illustrating the triangular wave used for the asynchronous PWM.

With reference to FIG. 5, first-group reference phase θrefa and second-group reference phase θrefb are calculated by first-group triangular wave generator 152a and second-group triangular wave generator 152b in the same manner as in FIG. 4.

First-group triangular wave generator 152a changes a phase θYa (hereinafter, also referred to as carrier a carrier phase θYa) of first-group asynchronous PWM triangular wave CWYa according to a carrier cycle Tcw assigned from the outside of control device 100. Carrier phase θYa is calculated such that one triangular wave is generated for each carrier cycle Tcw. That is, carrier phase θYa changes from 0 to 2π for each carrier cycle Tcw.

First-group triangular wave generator 152a generates asynchronous PWM triangular wave CWYa using the map data common to the generation of the synchronous PWM triangular wave such that the asynchronous PWM triangular wave CWYa oscillates once from "valley" to "valley" while carrier phase θYa changes from 0 to 2π. First-group triangular wave generator 152a can calculate the voltage value of asynchronous PWM triangular wave CWYa in each timing by referring to the map data using carrier phase θYa and DC voltage Vdc.

Similarly, second-group triangular wave generator 152b changes a phase θYb (hereinafter, also referred to as a carrier phase θYb) of second-group asynchronous PWM triangular wave CWYb according to carrier cycle Tcw. Similarly to carrier phase θXa, carrier phase θYb is calculated so as to change from 0 to 2π every carrier cycle Tcw.

Second-group triangular wave generator 152b can calculate the voltage value of asynchronous PWM triangular wave CWYb in each timing from carrier phase θYb and DC voltage Vdc using the map data. As a result, asynchronous PWM triangular wave CWYb is generated so as to oscillate once from the "valley" to the "valley" for each carrier cycle Tcw.

Asynchronous PWM triangular waves CWYa, CWYb correspond to the aggregate of the voltage values calculated in each timing. A constant phase difference assigned from the outside of control device 100 is generated between asynchronous PWM triangular waves CWYa, CWYb.

Because one cycle of each of reference phases θrefa, θrefb corresponds to one revolution of the electrical angle, one cycle of each of reference phases θrefa, θrefb is equal to one cycle of each of first-group voltage commands Vua, Vva, Vwa and second-group voltage commands Vub, Vvb, Vwb. Thus, frequencies of synchronous PWM triangular waves CWXa, CWXb is M times a frequency of the voltage command. On the other hand, the frequencies of the asynchronous PWM triangular waves CWYa, CWYb are kept constant according to carrier cycle Tcw. That is, the synchronous PWM corresponds to the "first mode", and the asynchronous PWM corresponds to the "second mode". Hereinafter, the switching between the synchronous PWM and the asynchronous PWM is also referred to as "mode switching".

Figure 6:
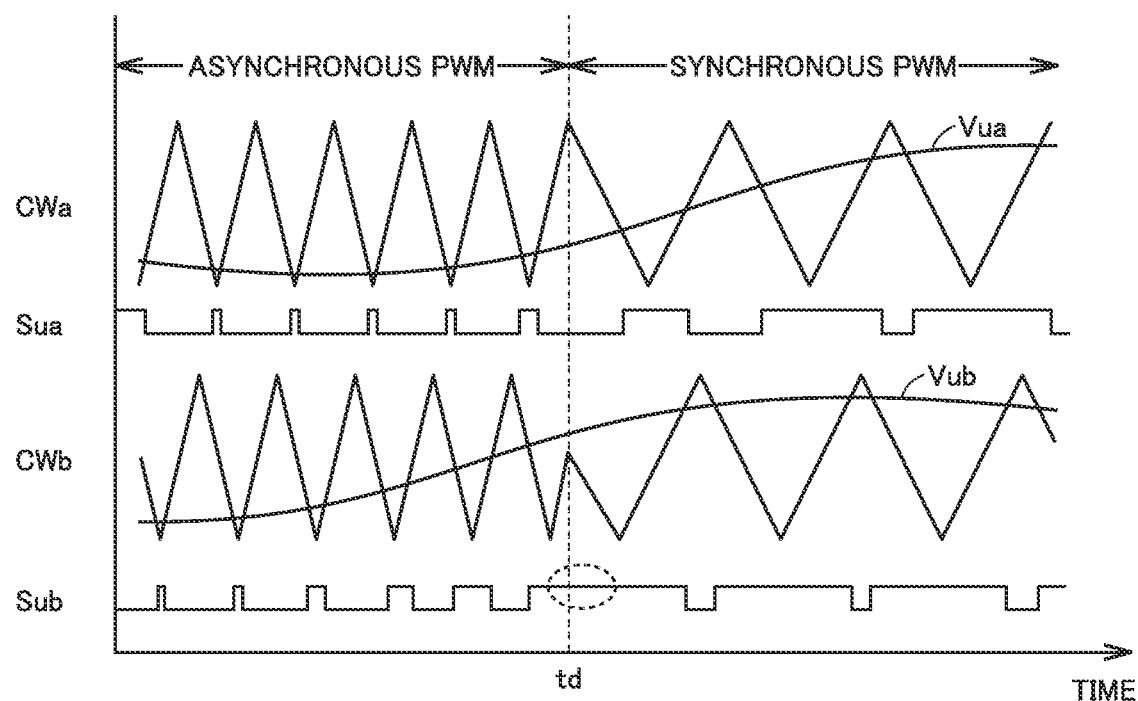
FIG. 6 is a conceptual waveform chart illustrating a comparative example of PWM control in mode switching between the asynchronous PWM and the synchronous PWM.

FIG. 6 is a conceptual waveform chart illustrating a comparative example of the PWM control in the mode switching between the asynchronous PWM and the synchronous PWM. FIG. 6 illustrates a control operation in the U phase of first-group inverter 15a and second-group inverter 15b using first-group PWM controller 133a and second-group PWM controller 133b. In particular, FIG. 6 illustrates a waveform example during the mode switching from the asynchronous PWM to the synchronous PWM.

With reference to FIG. 6, before time td, first-group triangular wave CWa and second-group triangular wave CWb are generated at a constant carrier cycle (Tcw) according to asynchronous PWM triangular waves CWYa, CWYb (FIG. 5).

In the comparative example, at time td when both asynchronous PWM triangular wave CWYa and synchronous PWM triangular wave CWXa become the phase corresponding to "peak", the mode switching from the asynchronous PWM to the synchronous PWM is simultaneously performed in both the PWM control of first-group inverter 15a and the PWM control of second-group inverter 15b.

As a result, at time td, because first-group carrier phases θXa, θYa are matched with each other, the continuity of the phase of first-group triangular wave CWa is secured before and after time td, namely, during the mode switching.

On the other hand, because the phase difference exists between carrier phases θXa, θXb and between carrier phases θYa, θYb, second-group carrier phases θXb, θYb are not matched with each other at time td. Thus, before and after time td, namely, during the mode switching, the phase of second-group triangular wave CWb becomes discontinuous.

First-group PWM controller 133a generates PWM signal Sua in the U phase based on the voltage comparison between triangular wave CWa and voltage command Vua. Specifically, during a period of Vca>CWa, PWM signal Sua is set to a logical high level (hereinafter, also referred to as an "H-level"). During the H-level period of PWM signal Sua, in a series circuit of the U phase, the positive-side switching element is turned on to apply DC voltage Vdc to the U-phase winding. On the other hand, during a period of Vca<CWa, PWM signal Sua is set to a logic low level (hereinafter, also referred to as an "L-level"). During the L-level period of PWM signal Sua, the negative-side switching element is turned on to disconnect the U-phase winding from DC voltage Vdc.

A ratio of the H-level period and the L-level period of PWM signal Sua is controlled for each cycle of triangular wave CWa, whereby the PWM control is performed on the voltage applied to the U-phase winding according to the sine wave voltage command Vua. Similarly, second-group PWM controller 133b generates PWM signal Sub in the U-phase by the PWM control based on the voltage comparison between triangular wave CWb and voltage command Vub.

From the waveforms of PWM signals Sua, Sub in FIG. 6, in the PWM control of first-group inverter 15a in which the continuity of the carrier phase is secured, a transition between the H-level and the L-level in PWM signal Sua is generated in each period of triangular wave CWa. Consequently, the on and off states of the positive-side switching element and the negative-side switching connected to first-group winding 20a (U-phase) are switched.

On the other hand, in the PWM control of second-group inverter 15b in which the continuity of the carrier phase is not secured, the period in which the level of PWM signal Sub is maintained beyond one cycle of triangular wave CWb is generated across time td. Consequently, the AC voltage applied to the U-phase winding from second-group inverter 15b may deviate from voltage command Vub by maintaining the on state of the positive-side switching element or the negative-side switching connected to second-group winding 20b (U-phase). As a result, there is a concern that the control of second-group inverter 15b becomes unstable.

In order to avoid the phenomenon described with reference to FIG. 6, the control device for the rotating electric machine according to the first embodiment performs the mode switching between the synchronous PWM and the asynchronous PWM while securing the continuity of the carrier phase.

Figure 7:
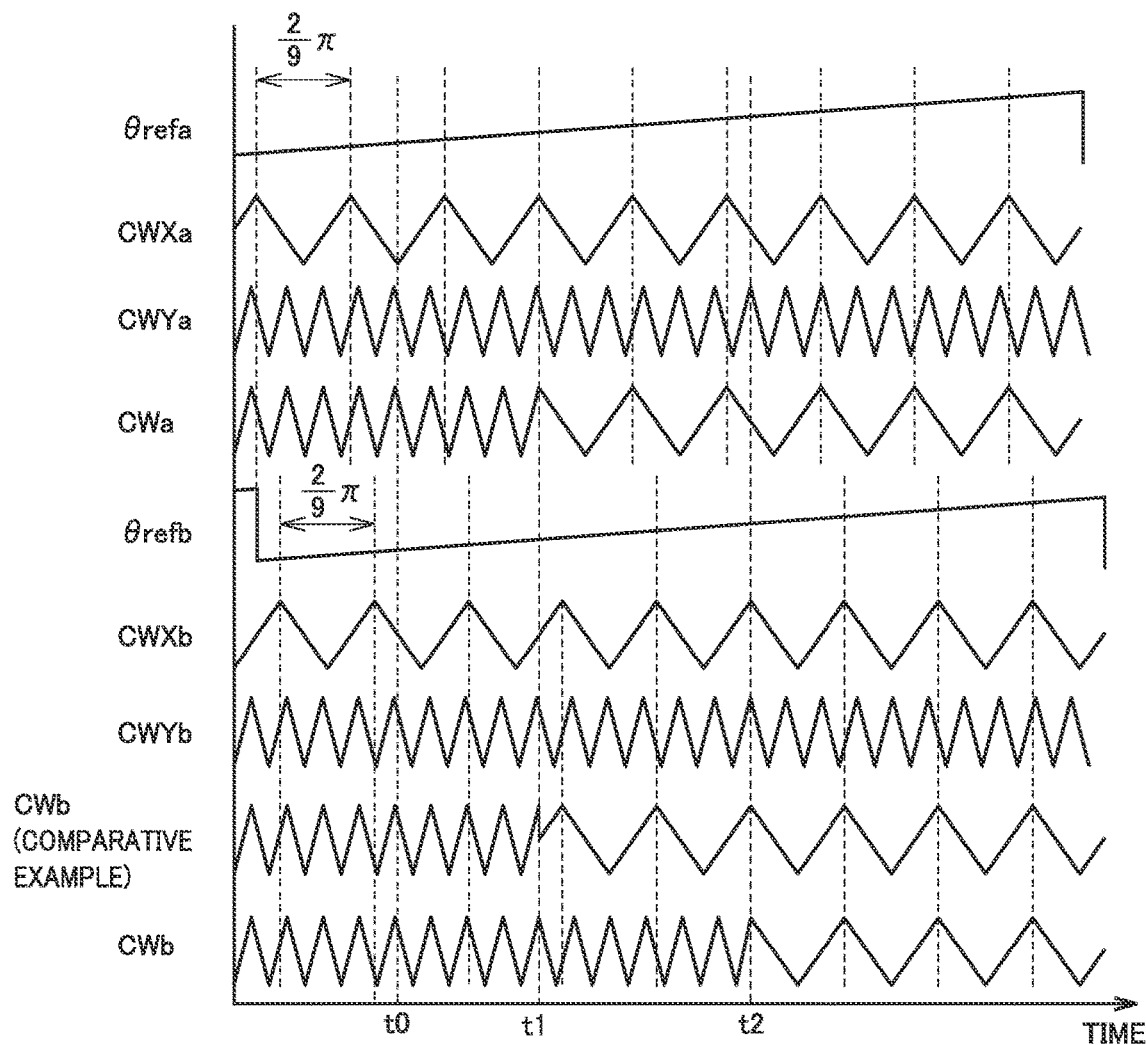
FIG. 7 is a conceptual waveform chart illustrating the mode switching between the asynchronous PWM and the synchronous PWM by the device for controlling a rotating electric machine according to the present embodiment.

FIG. 7 is a conceptual waveform chart illustrating mode switching between asynchronous PWM and synchronous PWM by the device for controlling the rotating electric machine according to the present embodiment.

Referring to FIG. 7, as described with reference to FIGS. 4 and 5, synchronous PWM triangular wave CWXa and asynchronous PWM triangular wave CWYa are generated according to the change in first-group reference phase θrefa. Similarly, as described with reference to FIGS. 4 and 5, synchronous PWM triangular wave CWXb and asynchronous PWM triangular wave CWYb are generated according to the change in second-group reference phase θrefb. In the example of FIG. 7, M=9 in the synchronous PWM, and one cycle of each of synchronous PWM triangular waves CWXa, CWXb corresponds to 2π/9 of each of reference phases θrefa, θrefb. That is, synchronous PWM triangular waves CWXa, CWXb are generated such that one cycle (0 to 2π) of reference phases θrefa, θrefb includes nine triangular waves.

At time t0 in which the asynchronous PWM is applied and CWa=CWYa and CWb=CWYb are satisfied, the mode switching from the asynchronous PWM to the synchronous PWM is instructed. After time t0, first-group triangular-wave controller 154a compares the phases of first-group synchronous PWM triangular wave CWXa to the phase of first-group asynchronous PWM triangular wave CWYa according to the change in first-group reference phase θrefa.

Similarly, second-group triangular wave controller 154b compares the phases of second-group of synchronous PWM triangular waves CWXb to the phase of second-group asynchronous PWM triangular waves CWYb according to the change in second-group reference phase θrefb.

At time t1, similarly to time td in FIG. 6, both synchronous PWM triangular wave CWXa and asynchronous PWM triangular wave CWYa become the phase corresponding to "peak". In this timing, first-group triangular wave controller 154a switches triangular wave CWa from the asynchronous PWM to the synchronous PWM. That is, CWa=CWXa is satisfied after time t1.

On the other hand, at time t1, the phases of second-group synchronous PWM triangular wave CWXb and second-group asynchronous PWM triangular wave CWYb are not matched with each other. Thus, the discontinuity of the phase described with reference to FIG. 6 is generated when second-group triangular wave controller 154b switches triangular wave CWb from the asynchronous PWM to the synchronous PWM in this timing.

Thus, second-group triangular wave controller 154b does not perform the switching to the synchronous PWM in the same timing as first-group triangular wave controller 154a, but continues the phase comparison of second-group synchronous PWM triangular wave CWXb and second-group asynchronous PWM triangular wave CWYb. That is, CWb=CWYb is satisfied even after time t1.

At time t2, when both synchronous PWM triangular wave CWXb and asynchronous PWM triangular wave CWYb become the phase corresponding to "peak" at time t2, second-group triangular wave controller 154b switches triangular wave CWb from the asynchronous PWM to the synchronous PWM. That is, CWb=CWXb is satisfied after time t2.

With this mode switching, the continuity of the carrier phase can be secured in both the PWM control of first-group inverter 15a and the PWM control of second-group inverter 15b. As a result, the instability of the inverter control described with reference to FIG. 6 can be prevented in the mode switching between the synchronous PWM and the asynchronous PWM. In the example of FIG. 7, time t1 corresponds to one example of the "first timing", and time t2 corresponds to one example of the "second timing".

In the example of FIG. 7, the mode switching of the PWM control of first-group inverter 15a is performed earlier, but the mode switching of the PWM control of second-group inverter 15b may be fixedly preceded. It is not always necessary to fix the inverter that is the target of the mode switching in advance. For example, the mode switching can be performed in one of the first group and the second group in which the carrier phases of the synchronous PWM triangular wave and the asynchronous PWM triangular wave are matched with each other earlier.

In the period (hereinafter, also referred to as a "mode transition period") from time t1 to time t2 in which the mode switching is waited for in one inverter 15b, it is understood that the control of the inverter 15b can be continued using the triangular wave before the mode switching (in the example of FIG. 7, the asynchronous PWM triangular wave).

On the other hand, during the mode transition period (times t1 to t2), one of the first-group and second-group inverters 15a, 15b is controlled by the synchronous PWM while the other is controlled by the asynchronous PWM. For this reason, when the mode transition period is lengthened, there is a concern that the control becomes unstable due to the difference between the AC voltages applied to first-group winding 20a and second-group winding 20b.

Figure 8:
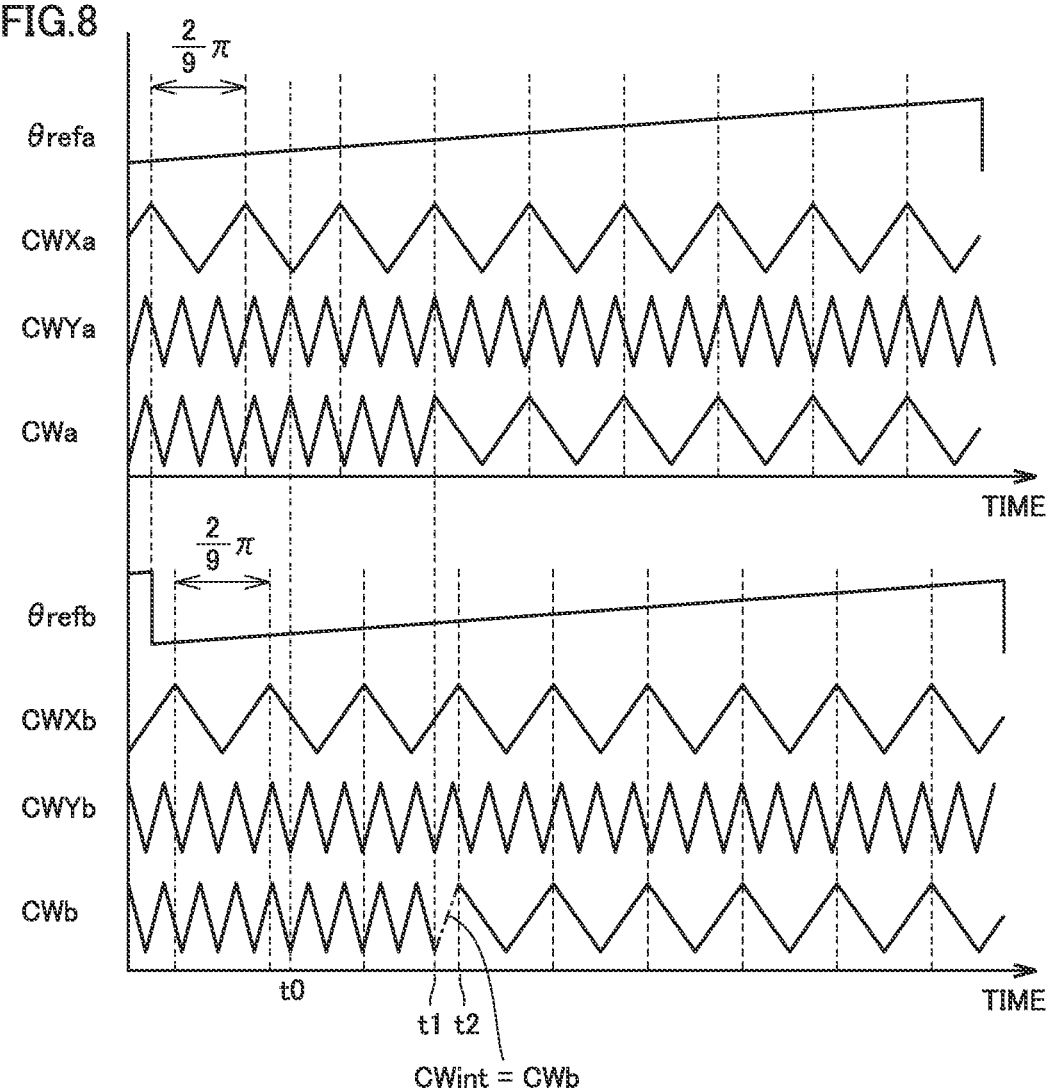
FIG. 8 is a conceptual waveform chart illustrating the mode switching in which an interpolation triangular wave is used by the control device for a rotating electric machine according to the present embodiment.

Thus, according to the control device for the rotating electric machine according to the present embodiment, the mode switching can be performed by applying an interpolation triangular wave in FIG. 8 for the purpose of shortening of the mode transition period.

FIG. 8 is a conceptual waveform chart illustrating the mode switching in which the interpolation triangular wave is used by the control device for the rotating electric machine according to the present embodiment.

With reference to FIG. 8, reference phases θrefa, θrefb, synchronous PWM triangular waves CWXa, CWXb, and asynchronous PWM triangular waves CWYa, CWYb change in the same manner as in FIG. 7. Further, similarly to FIG. 7, when the mode switching from the asynchronous PWM to the synchronous PWM is instructed at time t0, first-group triangular wave controller 154a switches triangular wave CWa from the asynchronous PWM to the synchronous PWM at time t1. On the other hand, at time t1, second-group triangular wave controller 154b determines time t2 that is the mode switching timing of triangular wave CWb, and performs the operations to generate an interpolation triangular wave CWint based on synchronous PWM triangular wave CWXb and asynchronous PWM triangular wave CWYb. Time t2 corresponds to an interpolation end point at which the application of interpolation triangular wave CWint is ended.

Interpolation triangular wave CWint is generated such that a carrier phase θ1 at time t1 is equal to the carrier phase of asynchronous triangular wave CWYb before the mode switching, and such that a carrier phase θ2 at time t2 is equal to the carrier phase of synchronization triangular wave CWXb after the mode switching. Interpolation triangular wave CWint is generated such that the carrier phase changes at a constant rate toward carrier phase θ2 at the interpolation end point.

Consequently, even when the mode switching is performed from time t2 while CWb=CWXb is set, the continuity of the carrier phase of second-group triangular wave CWb is secured. That is, the timing of the mode switching of second-group triangular wave CWb can intentionally be set by introducing interpolation triangular wave CWint. That is, also in the example of FIG. 8, time t1 corresponds to one example of the "first timing", and time t2 corresponds to one example of the "second timing".

For example, the mode switching timing (time t2) of triangular wave CWb can be set to the timing of becoming the phase corresponding to "peak" after the time t1 because asynchronous triangular wave CWYb is close to "valley" at time t1. This enables the mode transition period to be shortened after the continuity of the carrier phase during the mode switching is secured for the subsequent triangular wave to which the mode switching is applied (in FIG. 8, second-group triangular wave CWb).

Second-group triangular wave controller 154b can set time t2 according to the carrier phase of the synchronous PWM triangular wave CWXb and a change rate of reference phase θrefb at the time t1. Further, the change rate of interpolation triangular wave CWint can be calculated by dividing the phase difference between the carrier phase (π for "peak") of synchronous PWM triangular wave CWXb at time t2 that is the interpolation end point and the carrier phase (that is, asynchronous PWM triangular wave CWYb) of triangular wave CWb at time t1 (current time).

In the mode transition period (times t1 to t2), second-group triangular wave controller 154b periodically performs an interpolation calculation to change the carrier phase according to the calculated constant change rate.

Consequently, triangular wave CWb can be generated according to interpolation triangular wave CWint. As a result, the control of the inverter 15b to which the mode switching is applied later can further be stabilized because the mode transition period can be shortened by applying the stepwise mode switching in addition to the security of the continuity of the carrier phase in the PWM control of both the inverters 15a, 15b.

The application start timing of interpolation triangular wave CWint may not be the same as time t1 (first timing), but can be set to the firstly arriving timing after "peak" or "valley" of the triangular wave (in FIG. 8, second-group triangular wave CWb) in which the mode switching is not completed. In this case, the timing at which "valley" or "peak" of the triangular wave (in the example of FIG. 8, synchronous PWM triangular wave CWXb) applied after mode switching firstly arrives after the start of the application of interpolation triangular wave CWint can be fixed as the interpolation end point (that is, time t2).

Figure 9:
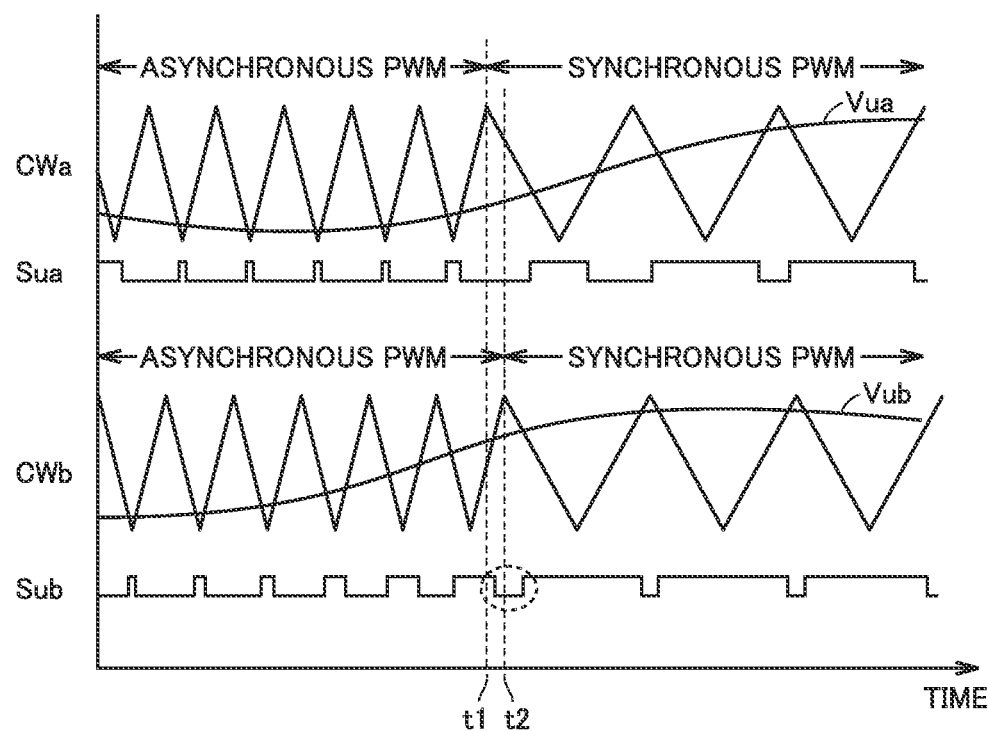
FIG. 9 is a conceptual waveform chart illustrating an example of the PWM control when the mode switching in FIG. 8 is applied.

FIG. 9 is a conceptual waveform chart illustrating an example of the PWM control when the mode switching in FIG. 8 is applied.

With reference to FIG. 9, similarly to FIG. 6, the continuity of the carrier phase of first-group triangular wave CWa is secured in the mode switching from the asynchronous PWM to the synchronous PWM at time t1. Thus, PWM signal Sua of first-group inverter 15a is generated such that the switching (the transition between the H-level and the L-level) is generated for each cycle of the triangular wave even in the mode switching.

On the other hand, second-group triangular wave CWb is generated according to interpolation triangular wave CWint after time t1. Then, the mode switching of second-group triangular wave CWb is performed at time t2 that is the next "peak" timing of synchronous PWM triangular wave CWXb. As a result, PWM signal Sub of second-group inverter 15b can also be generated such that the switching (the transition between the H-level and the L-level) is generated for each cycle of the triangular wave during the mode switching.

As described above, according to the control device for the rotating electric machine according to the first embodiment, the mode switching between the synchronous PWM and the asynchronous PWM in the PWM control by first-group inverter 15a and second-group inverter 15b, for controlling the double winding type rotating electric machine including the first-group winding and the second-group winding wound so as to have the mechanical angle difference, can smoothly be performed.

The mode switching from the asynchronous PWM to the synchronous PWM is described in the first embodiment. For the mode switching from the synchronous PWM to the asynchronous PWM, the control can be performed in the same manner according to the comparison of the carrier phases of the triangular wave (synchronous PWM) applied before the mode switching and the triangular wave (asynchronous PWM) applied after the mode switching.

As long as the continuity of the carrier phase is secured, the mode switching can be performed at timing except for the timing corresponding to "peak" or "valley" of the synchronous PWM and/or the asynchronous PWM. However, from the viewpoint of stably controlling the on and off states of the switching element in one cycle of the triangular wave, preferably the timing of the mode switching (first and second timings) is set while limited to the timing of "peak" or "valley" of the triangular wave.

Further, during introduction of interpolation triangular wave CWint, the timing of time t2 is not limited to the timing of next "peak" or "valley", but time t2 is set in the timing described with reference to FIG. 8 to enhance the effect that shortens the mode transition period.

Second Embodiment

Control processing of the mode switching between the synchronous PWM and the asynchronous PWM by the device for controlling the rotating electric machine according to a second embodiment will be described. That is, in the second embodiment, the mode switching described in the first embodiment will be described using a flowchart.

Control device 100 executes a program previously stored in ROM 116b using operation device 115 (CPU), whereby the processing of each step illustrated in the following flowchart can mainly be performed. Alternatively, some or all of the steps described below can be processed using a dedicated electronic circuit (hardware) provided in operation device 115.

Figure 10:
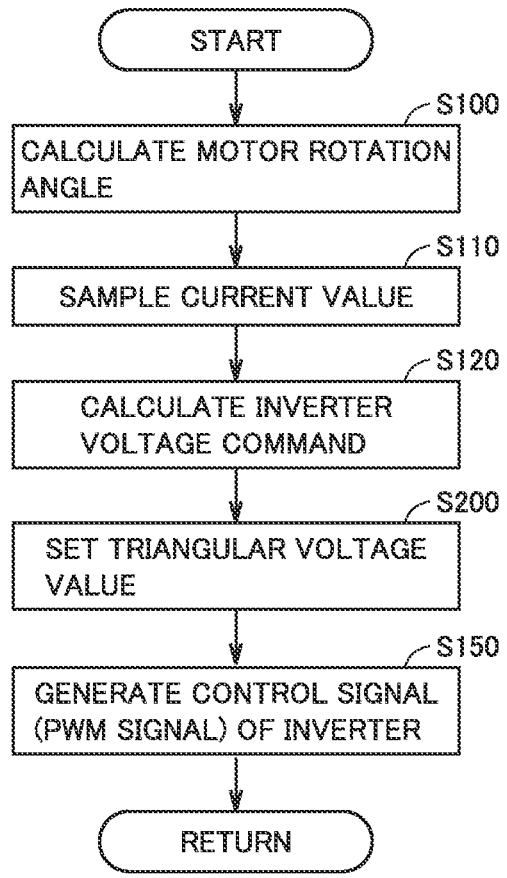
FIG. 10 is a flowchart illustrating a control method for a rotating electric machine according to the present embodiment.

FIG. 10 is a flowchart illustrating a control method for the rotating electric machine of the present embodiment.

With reference to FIG. 10, control device 100 calculates a motor rotation angle based on an output signal of rotation angle sensor 11 in step S100. The processing in step S100 is performed by the function of magnetic pole position detector 130 in FIG. 1.

Further, in step S110, control device 100 detects currents Iua, Iva, Iwa of first-group winding 20a and currents Iub, Ivb, Iwb of second-group winding 20b by sampling the output signals of current sensors 22a, 22b. The processing in step S110 is performed by the functions of current detectors 142a, 142b illustrated in FIG. 3.

In step S120, control device 100 calculates voltage commands Vua, Vva, Vwa of first-group inverter 15a and voltage commands Vub, Vvb, Vwb of second-group inverter 15b. The processing in step S120 is performed by the function of voltage command operation unit 140 in FIG. 1.

Further, when setting the triangular wave voltage in step S200, control device 100 generates PWM signal Sua, Sva, Swa for controlling first-group inverter 15a and PWM signals Sub, Svb, Swb for controlling second-group inverter 15b by comparing the voltage command (S120) and the triangular wave voltage (S200) in step S150. Consequently, the AC voltage applied to windings 20a, 20b of rotating electric machine 10 by inverters 15a, 15b is controlled according to the voltage command of the feedback control.

The processing in step S200 is performed by triangular wave supply unit 150 having the function of generating triangular waves CWa, CWb. The processing in step S150 is performed by the function of PWM controller 133.

As described in the first embodiment, the synchronous PWM and the asynchronous PWM are selectively applied in setting the triangular wave voltage in step S200.

Figure 11:
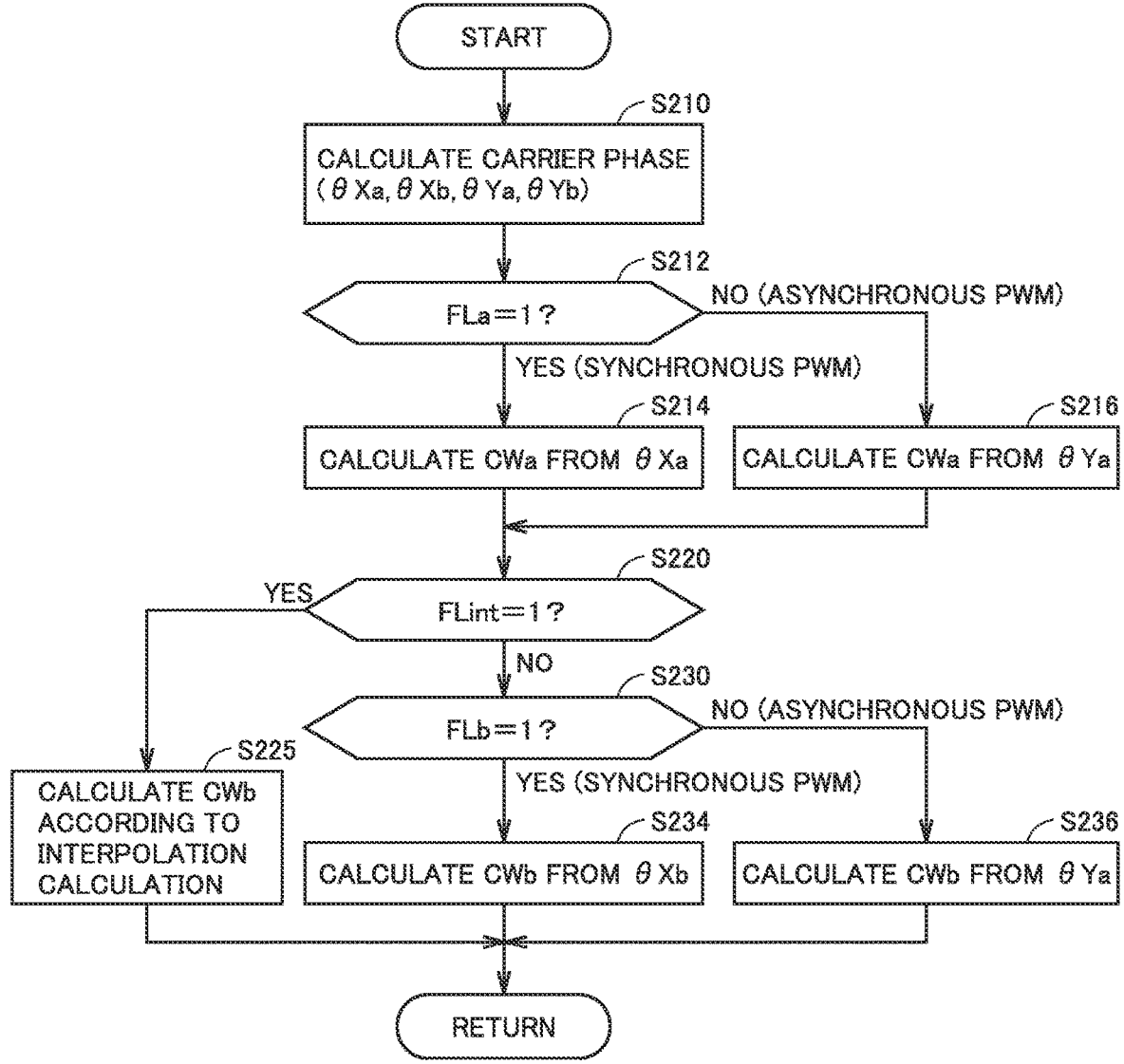
FIG. 11 is a flowchart illustrating details of processing of setting a triangular wave voltage in FIG. 10.

FIG. 11 is a flowchart illustrating details of processing of setting the triangular wave voltage in step S200 of FIG. 10.

With reference to FIG. 11, control device 100 calculates the carrier phase in step S210. Specifically, reference phases $\theta refa$, $\theta refb$ are calculated from motor rotation angles $\theta a$, $\theta b$ calculated in step S100 using the equations (10), (11). Further, as described with reference to FIGS. 4 and 5, first-group carrier phases $\theta Xa$ (synchronous PWM) and $\theta Xb$ (asynchronous PWM), second-group carrier phases $\theta Ya$ (synchronous PWM) and θYb (asynchronous PWM) are calculated from reference phases θrefa, θrefb.

In step S212, control device 100 checks the value of a flag FLa indicating whether the synchronous PWM control or the asynchronous PWM control is applied to the PWM control of first-group of inverters 15a.

Flag FLa is set to FLa=1 in selecting the synchronous PWM, and is set to FLa=0 in selecting the asynchronous PWM. Similarly, a flag FLb relating to second-group of inverters 15b is introduced. Flag FLb is also set to FLb=1 in selecting the synchronous PWM, and is set to FLb=0 in selecting the asynchronous PWM. As described later, the setting of the value (0 or 1) of flags FLa and FLb controls the mode switching.

For FLa=1 (YES in S212), control device 100 proceeds to the processing in step S214 to calculate the voltage value of triangular wave CWa from synchronous PWM carrier phase θXa using the map data. On the other hand, for FLa=0 (NO in S212), in step S216, control device 100 calculates the voltage value of triangular wave CWa from asynchronous PWM carrier phase θYa using the map data. Consequently, one of the asynchronous PWM and the synchronous PWM is selected, and the voltage value of first-group triangular wave CWa is calculated.

Further, control device 100 determines whether or a flag FLint is 1 in step S220. Flag FLint is set to FLint=1 when the interpolation triangular wave is applied in the mode transition period described with reference to FIGS. 7 and 8, otherwise FLint=0 (default value) is set. The setting of the value of flag FLint will also be described in detail later.

For FLint=0 (NO in S220), control device 100 checks the value of flag FLb in step S230. For FLb=1 (YES in S230), the processing proceeds to step S234, and the voltage value of triangular wave CWb is calculated from the synchronous PWM carrier phase θXb using the map data. On the other hand, for FLb=0 (NO in S230), control device 100 proceeds to step S236, and the voltage value of triangular wave CWb is calculated from asynchronous PWM carrier phase θYb using the map data.

On the other hand, for FLint=1 (YES in S220), control device 100 calculates the voltage value of triangular wave CWb according to the interpolation calculation obtaining interpolation triangular wave CWint described with reference to FIG. 8.

Figure 12:
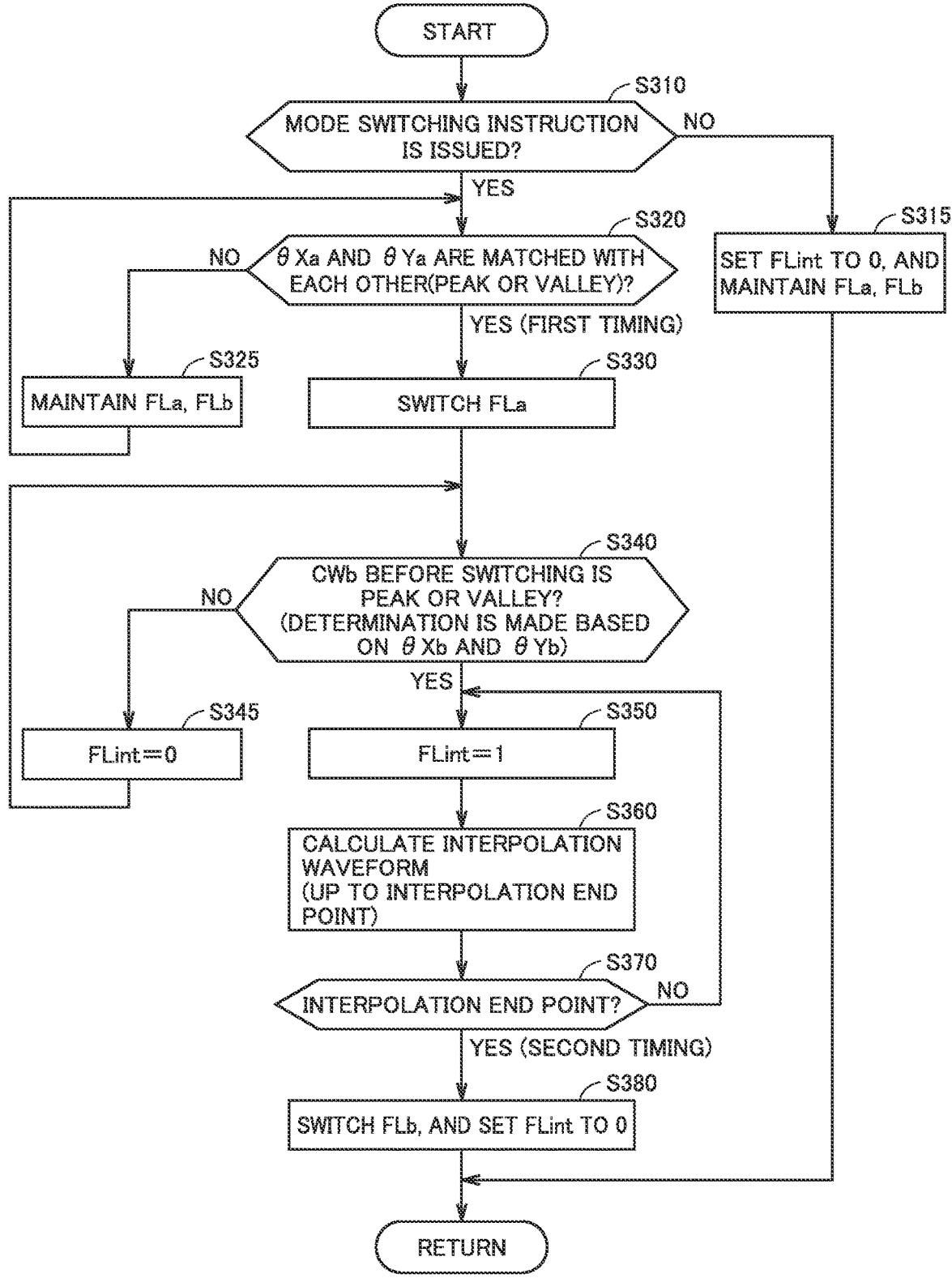
FIG. 12 is a flowchart illustrating an example of flag setting processing for the mode switching.

FIG. 12 illustrates processing of setting flags FLa, FLb, FLint for the mode switching. The control processing in FIG. 12 is repeatedly executed separately from the processing in FIG. 11, and the latest values of carrier phases θXa, θXb, θYa, θYb periodically updated in step S210 of FIG. 11 is used in each step of the control processing in FIG. 12. Similarly, the latest values of flags FLa, FLb, FLint updated each time by the processing in FIG. 12 are referred to in steps S212, S220, S230 of FIG. 11.

With reference to FIG. 12, in step S310, control device 100 determines whether a mode switching instruction is issued. When the mode switching instruction is not issued (NO in S310), control device 100 sets flag FLint to 0 that is the default value while maintaining the values of flags FLa, FLb as they are in step S315. The control processing in FIG. 11 is performed according to flags FLa, FLb, FLint set in this way, whereby the voltage values of triangular waves CWa, CWb is set when the mode switching is not performed.

On the other hand, when the mode switching instruction is issued (YES in S310), control device 100 performs the matching comparison between the carrier phases of first-group inverter 15a in step S320. That is, when synchronous PWM carrier phase θXa and asynchronous PWM carrier phase θYa are matched with each other (specifically, when|θXa−θYa|<ε holds), the affirmative determination is made in step S320, and otherwise, the negative determined is made in step S320.

Preferably, in step S320, the affirmative determination is made only when carrier phases θXa, θYa are the phase corresponding to "peaks" or "valleys" and when carrier phases θXa, θYa are matched with each other.

Control device 100 repeats the matching comparison (S320) while maintaining the values of flags FLa, FLb in step S325 until carrier phases θXa, θYa are matched with each other (NO in S320).

When carrier phases θXa, θYa are matched with each other (YES in S320), control device 100 changes the value of flag FLa from 0 to 1 or from 1 to 0 in order to switch the mode of the PWM control of first-group inverter 15a in step S330. Consequently, the mode switching can be performed in the first timing (time t1) of FIG. 8.

Further, when the mode switching of inverter 15a is completed, control device 100 determines whether the carrier phase of triangular wave CWb in which the mode switching is not completed corresponds to "peak" or "valley" in step S340. In the mode switching from the synchronous PWM to the asynchronous PWM, the determination in step S340 is made based on carrier phase θXb. On the other hand, in the mode switching from the asynchronous PWM to the synchronous PWM, the determination in step S340 is made based on carrier phase θYb. Consequently, after the mode switching in first-group inverters 15a, until "peak" or "valley" of second-group triangular wave CWb in which the mode switching is not completed arrives firstly, the negative determination is made in step S340, and control device 100 maintains flag FLint=0 in step S345. In the period of flag FLint=0, the triangular wave before the mode switching is used as second-group triangular wave CWb without applying interpolation triangular wave CWint.

When "peak" or "valley" of triangular wave CWb arrives (YES in S340), control device 100 proceeds to step S350 to change the value of flag FLint from 0 to 1. Further, in step S360, control device 100 performs the interpolation calculation while setting the interpolation end point (that is, the second timing). As described above, the interpolation end point is set to the timing (second timing) at which the triangular wave applied after the mode switching becomes the phase of "peak" or "valley". For example, when the affirmative determination is made in step S340 at "peak" of triangular wave CWb before the mode switching, the timing at which the triangular wave applied after the mode switching reaches next "valley" can be set to the interpolation end point. Conversely, when the affirmative determination is made in step S340 at "valley" of triangular wave CWb before the mode switching, the timing at which the triangular wave applied after the mode switching reaches next "peak" is set to the interpolation end point.

As described above, the interpolation calculation is performed such that the carrier phase of interpolation triangular wave CWint changes at a constant rate toward the phase (corresponding to "peak" or "valley") of the triangular wave applied after the interpolation end point.

When the interpolation calculation is started, control device 100 calculates the voltage value of interpolation triangular wave CWint according to the interpolation calculation (S360) while maintaining FLint=1 (S350), until the interpolation end point, namely, time t2 in FIG. 8 arrives (NO in S370). In step S225 of FIG. 11, the voltage value of triangular wave CWb is calculated according to the calculation result in step S360.

When the interpolation end point arrives during the performance of the interpolation calculation (YES in S370), control device 100 advances the processing to step S380, sets FLint=0 in order to end the application of the interpolation triangular wave, and changes flag FLb from 0 to 1 or from 1 to 0 in order to switch the PWM control mode of second-group inverter 15b. Consequently, the mode switching can be performed in the second timing (time t2) of FIG. 8.

According to flags FLa, FLb, FLint controlled according to the control processing in FIG. 12, the mode switching between the synchronous PWM and the asynchronous PWM described with reference to FIG. 8 can be performed by the settings of the voltage values of triangular waves CWa, CWb by the control processing of FIG. 11.

By omitting steps S340 and S350 in the processing of FIG. 12, the application of the interpolation triangular wave CWint can be started throughout the mode transition period from the mode switching time (time t1) of first-group inverter 15a.

Figure 13:
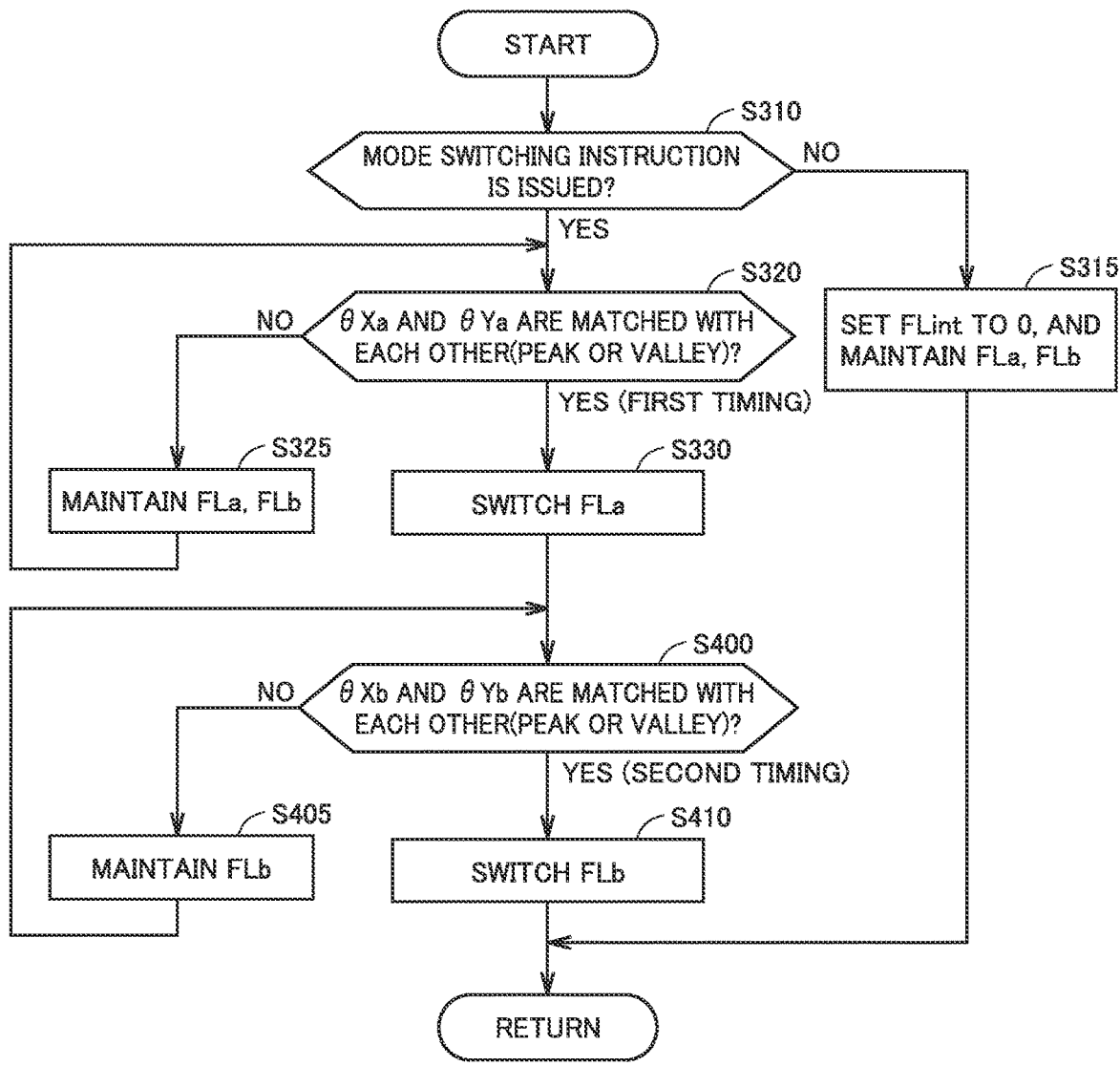
FIG. 13 is a flowchart illustrating a modification of the flag setting processing for the mode switching.

FIG. 13 is a flowchart illustrating a modification of the flag setting processing for the mode switching.

With reference to FIG. 13, the pieces of processing in steps S310 to S330, namely, the mode switching processing relating to first-group inverter 15a is common to FIG. 12.

When the mode switching of inverter 15a is completed, in step S400, control device 100 compares carrier phase θXb of the synchronous PWM and carrier phase θYb of the asynchronous PWM with respect to triangular wave CWb used in the PWM control of inverter 15b in which the mode switching is not completed.

The determination in step S400 can be made in the same manner as in step S320. Control device 100 maintains the value of flag FLb in step S405 when carrier phases θXb, θYb are not matched with each other (NO in S400). On the other hand, when carrier phases θXb, θYb are matched with each other (YES in S400), control device 100 advances the processing to step S410, and changes the value of flag FLb from 0 to 1 or from 1 to 0 in order to switch the PWM control mode of inverter 15b.

Consequently, the operation can be performed in the second timing (time t2) of FIG. 7 by the mode switching to which interpolation triangular wave CWint is not applied.

That is, using flags FLa, FLb controlled according to the control processing in FIG. 13, the mode switching between the synchronous PWM and the asynchronous PWM described with reference FIG. 7 can be performed by the settings of the voltage values of triangular waves CWa, CWb by the control processing of FIG. 11. When the pieces of control processing in FIGS. 13 and 11 are combined, FLint is fixed to 0 to always make the negative determination in step S220, and the processing in step S225 is skipped.

The control example in which the mode switching of first-group inverter 15a is fixedly performed in advance is described in FIGS. 12 and 13. Conversely, the carrier phase comparison of second-group inverter 15b may be performed in advance. Alternatively, in step S320 (FIGS. 12 and 13), both the carrier phase comparison (S320) relating to first-group inverter 15a and the phase comparison relating to second-group inverter 15b are performed, the mode of one of the inverters in which the carrier phases are matched with each other earlier is switched, and the mode switching of the other inverter is controlled according to the steps after step S340 in FIG. 12 or the steps after step S400 in FIG. 13b.

As described above, by performing the control processing according to the flowcharts in FIGS. 11 to 13, control device 100 can smoothly perform the mode switching between the synchronous PWM and the asynchronous PWM in the PWM control performed by first-group inverter 15a and second-group inverter 15b that control the double winding type rotating electric machine in the same manner as in the first embodiment.

In the first and second embodiments, by way of example, the triangular wave is exemplified as the carrier wave for the PWM control. Alternatively, a periodic waveform except for the triangular wave such as a sawtooth wave can also be used as the carrier wave.

That is, first-group inverter 15a corresponds to one example of the "first inverter", second-group inverter 15b corresponds to one example of the "second inverter", triangular wave CWa corresponds to one example of the "first carrier wave", and triangular wave CWb corresponds to an example of the "second carrier wave". Similarly, triangular wave supply unit 150 corresponds to an example of the "carrier wave supply unit", and triangular wave controller 154 corresponds to an example of the "carrier wave controller".

It should be considered that the disclosed embodiments are an example in all respects and not restrictive. The scope of the present disclosure is defined by not the description above, but the claims, and it is intended that all modifications within the meaning and scope of the claims are included in the present disclosure.

REFERENCE SIGNS LIST

10: double winding type rotating electric machine, 11: rotation angle sensor, 15a: first-group inverter, 15b: second-group inverter, 20a: winding (first group), 20b: winding (second group), 22a: first-group current sensor, 22b: second-group current sensor, 24: voltage sensor, 100: control device, 112: input circuit, 115: arithmetic device, 116: storage device, 120: output circuit, 130: magnetic pole position detector, 133: PWM controller, 133a: first-group PWM controller, 133b: second-group PWM controller, 140: voltage command operation unit, 140a: first-group voltage command operation unit, 140b: second-group voltage command operation unit, 141a: first-group current command calculator, 141b: second-group current command calculator, 142a: first-group current detector, 142b: second-group current detector, 143a: first-group three-phase dq converter, 143b: first-group three-phase dq converter, 144a: first-group current feedback controller, 144b: second-group current feedback controller, 145a: first-group non-interference processor, 145b: second-group non-interference processor, 146a: first-group dq three-phase converter, 146b: second-group dq three-phase converter, 150: triangular wave supply unit, 152: triangular wave generator, 152a: first-group triangular wave generator, 152b: second-group triangular wave generator, 154: triangular wave controller, 154a: first-group triangular wave controller, 154b: second-group triangular wave controller, CWXa: synchronization triangular wave (first group), CWXb: synchronization triangular wave (second group), CWYa: asynchronization triangular wave (first group), CWYb: asynchronization triangular wave (second group), CWa: triangular wave (first group), CWb: triangular wave (second group), CWint: interpolation triangular wave, Ida, Idb, Iqa, Iqb: shaft current command, Iua, Iub, Iva: winding current (first group), Ivb, Iwa, Iwb: winding current (second group), Sua, Sva, Swa: first-group PWM signal, Sub, Svb, Swb: 21st-group PWM signal, Tcw: carrier cycle, Vua, Vva, Vwa: first-group voltage command, Vub, Vvb, Vwb: second-group voltage command

The invention claimed is:

1. A control device for a rotating electric machine including a first-group winding and a second-group winding wound around a stator with a mechanical angle difference, the control device comprising:
a voltage command operation unit to generate a first-group voltage command for a first inverter that controls a voltage applied to the first-group winding and a second-group voltage command for a second inverter that controls a voltage applied to the second-group winding;
a carrier wave supply unit to generate a first carrier wave used for first pulse width modulation control in the first inverter and a second carrier wave used for second pulse width modulation control in the second inverter; and
a PWM controller to generate a first-group PWM signal for controlling the first inverter by the first pulse width modulation control based on comparison between the first-group voltage command and the first carrier wave, and to generate a second-group PWM signal for controlling the second inverter by the second pulse width modulation control based on comparison between the second-group voltage command and the second carrier wave,
the carrier wave supply unit including
a carrier wave controller to switch between the first and second carrier waves used for the first pulse width modulation control and the second pulse width modulation control according to selection of one of a first mode in which frequencies of the first and second carrier waves change so as to become an integral multiple of a frequency of the applied voltage and a second mode in which the frequencies of the first and second carriers are kept constant, and
when the mode switching between the first and second modes is instructed, the carrier wave controller performing the mode switching in first timing at which a carrier wave phase according to the first mode and a carrier wave phase according to the second mode are matched with each other on one carrier wave of the first and second carrier waves, and performing the mode switching in second timing at which the carrier wave phase according to the first mode and the carrier wave phase according to the second mode are matched with each other on the other carrier wave of the first and second carrier waves after the first timing.

2. The control device according to claim 1, wherein the carrier wave controller supplies the other carrier wave to the PWM controller according to one mode of the first and second modes selected before the mode switching during a mode transition period between the first timing and the second timing.

3. The control device according to claim 1, wherein the carrier wave controller supplies an interpolation carrier wave, generated from the other carrier wave according to the first mode and the other carrier wave according to the second mode, to the PWM controller as the other carrier wave during a mode transition period between the first timing and the second timing, and
the interpolation carrier wave is generated such that in the mode transition period, the carrier wave phase changes at a constant rate toward the phase of the one carrier wave after the mode switching in the second timing.

4. The control device according to claim 1, wherein the first timing is set corresponding to a peak or a valley of the one carrier wave.

5. The control device according to claim 3, wherein the first timing is set corresponding to one of a peak and a valley of the one carrier wave, and
the second timing is set corresponding to the other of the peak and the valley of the other carrier wave that arrives after the first timing.

6. A control method for a rotating electric machine including a first-group winding and a second-group winding wound around a stator with a mechanical angle difference, the control method comprising:
generating a first-group voltage command for a first inverter that controls a voltage applied to the first-group winding and a second-group voltage command for a second inverter that controls a voltage applied to the second-group winding;
supplying a first carrier wave used for first pulse width modulation control in the first inverter and a second carrier wave used for second pulse width modulation control in the second inverter; and
generating a first-group PWM signal for controlling the first inverter by the first pulse width modulation control based on comparison between the first-group voltage command and the first carrier wave, and generating a second-group PWM signal for controlling the second inverter by the second pulse width modulation control based on comparison between the second-group voltage command and the second carrier wave,
wherein supplying the first and second carrier waves includes switching between the first and second carrier waves used for the first pulse width modulation control and the second pulse width modulation control according to selection of one of a first mode in which frequencies of the first and second carrier waves change so as to become an integral multiple of a frequency of the applied voltage and a second mode in which the frequencies of the first and second carrier waves are kept constant, and
switching between the first and second carrier waves includes: when the mode switching between the first and second modes is instructed,
performing the mode switching in first timing at which a carrier wave phase according to the first mode and a carrier wave phase according to the second mode are matched with each other on one carrier wave of the first and second carrier waves; and
performing the mode switching in second timing at which the carrier wave phase according to the first mode and the carrier wave phase according to the second mode are matched with each other on the other carrier wave of the first and second carrier waves after the first timing.

7. The control method according to claim 6, wherein switching between the first and second carrier waves further includes supplying the other carrier wave used for the first or second pulse width modulation control according to one mode of the first and second modes selected before the mode switching during a mode transition period between the first timing and the second timing.

8. The control method according to claim 6, wherein switching between the first and second carrier waves, further includes supplying an interpolation carrier wave generated from the other carrier wave according to the first mode and the other carrier according to the second mode, as the other carrier wave used for the first pulse width modulation control or the second pulse width modulation control, in the mode transition period between the first timing and the second timing, and the interpolation carrier wave is generated such that in the mode transition period, the carrier wave phase changes at a constant rate toward the phase of the one carrier wave after the mode switching in the second timing.

9. The control method according to claim 6, wherein the first timing is set corresponding to a peak or a valley of the one carrier wave.

10. The control method according to claim 8, wherein the first timing is set corresponding to one of a peak and a valley of the one carrier wave, and the second timing is set corresponding to the other of the peak and the valley of the other carrier wave that arrives after the first timing.

11. The control device according to claim 2, wherein the first timing is set corresponding to a peak or a valley of the one carrier wave.

12. The control device according to claim 3 wherein the first timing is set corresponding to a peak or a valley of the one carrier wave.

13. The control method according to claim 7, wherein the first timing is set corresponding to a peak or a valley of the one carrier wave.

14. The control method according to claim 8, wherein the first timing is set corresponding to a peak or a valley of the one carrier wave.

\* \* \* \* \*